(12) United States Patent
Doepke et al.

(10) Patent No.: US 9,247,133 B2
(45) Date of Patent: Jan. 26, 2016

(54) IMAGE REGISTRATION USING SLIDING REGISTRATION WINDOWS

(75) Inventors: Frank Doepke, San Jose, CA (US);
Todd S. Sachs, Palo Alto, CA (US);
Kevin L. Hunter, Sunnyvale, CA (US);
Alexis Gatt, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 1194 days.

(21) Appl. No.: 13/151,149

(22) Filed: Jun. 1, 2011

(65) Prior Publication Data
US 2012/0307000 A1  Dec. 6, 2012

(51) Int. Cl.
| H04N 5/232 | (2006.01) |
| --- | --- |
| G06T 3/00 | (2006.01) |
| G06T 3/40 | (2006.01) |
| H04N 5/262 | (2006.01) |
| G06T 7/00 | (2006.01) |

(52) U.S. Cl.
CPC .......... *H04N 5/23238* (2013.01); *G06T 3/0068* (2013.01); *G06T 3/4038* (2013.01); *G06T 7/0034* (2013.01); *H04N 5/2624* (2013.01)

(58) Field of Classification Search
None
See application file for complete search history.

(56) References Cited

U.S. PATENT DOCUMENTS

| 6,075,905 | A | 6/2000 | Herman |
| --- | --- | --- | --- |
| 6,094,215 | A | 7/2000 | Sundahl et al. |
| 6,167,404 | A | 12/2000 | Morcos |
| 6,243,103 | B1 | 6/2001 | Takiguchi |
| 6,304,284 | B1 | 10/2001 | Dunton et al. |
| 6,978,052 | B2 | 12/2005 | Beged-Dov et al. |
| 7,006,124 | B2 | 2/2006 | Peleg |
| 7,409,105 | B2 | 8/2008 | Jin et al. |
| 7,424,218 | B2 | 9/2008 | Baudisch et al. |
| 7,460,730 | B2 | 12/2008 | Pal |
| 7,577,314 | B2 | 8/2009 | Zhou |
| 7,590,335 | B2 | 9/2009 | Kobayashi |
| 7,627,225 | B2 | 12/2009 | Shimosato et al. |
| 7,656,428 | B2 | 2/2010 | Trutna, Jr. |

(Continued)

FOREIGN PATENT DOCUMENTS

| CN | 101158889 A | 4/2008 |
| --- | --- | --- |
| CN | 100524187 C | 8/2009 |

(Continued)

OTHER PUBLICATIONS

"Rendering by Manifold Hopping." Submitted to Siggraph '2001, Paper No. 194, Catgory: research. pp. 1-10.

(Continued)

*Primary Examiner* — Heather Jones
(74) *Attorney, Agent, or Firm* — Blank Rome LLP

(57) ABSTRACT

This disclosure pertains to devices, methods, and computer readable media for performing image registration. A few generalized steps may be used to carry out the image registration techniques described herein: 1) acquiring image data from an image sensor; 2) selecting a pair of overlapping image portions from the acquired image data for registration; 3) determining an area of "maximum energy" in one of the image portions being registered; 4) placing an image registration window over both image portions at the determined location of maximum energy; 5) registering the overlapping image portions using only the image data falling within the image registration windows; and 6) determining, according to one or more metrics, whether the image registration window should be shifted from a current location before registering subsequently acquired image portions.

26 Claims, 16 Drawing Sheets

(56) References Cited

U.S. PATENT DOCUMENTS

| | | | |
|---|---|---|---|
| 7,656,429 B2 | 2/2010 | Larson | |
| 7,746,404 B2 | 6/2010 | Deng et al. | |
| 7,796,871 B2 | 9/2010 | Park et al. | |
| 7,844,130 B2 | 11/2010 | Dong | |
| 7,912,337 B2 | 3/2011 | Souchard | |
| 1,315,114 A1 | 6/2011 | Doepke | |
| 8,121,809 B2 | 2/2012 | Mealy | |
| 1,348,995 A1 | 6/2012 | Tico | |
| 1,349,018 A1 | 6/2012 | Tico | |
| 8,285,079 B2 | 10/2012 | Robertson | |
| 8,310,522 B2 | 11/2012 | Jeong | |
| 8,311,355 B2 | 11/2012 | Brunner | |
| 8,379,054 B2 | 2/2013 | Katayama | |
| 1,391,124 A1 | 6/2013 | Doepke | |
| 2002/0126913 A1 | 9/2002 | Kotake | |
| 2004/0155968 A1 | 8/2004 | Cheatle | |
| 2004/0201705 A1 | 10/2004 | Lin | |
| 2004/0233274 A1 | 11/2004 | Uyttendaele | |
| 2005/0168593 A1 | 8/2005 | Akizuki et al. | |
| 2006/0114363 A1 | 6/2006 | Kang et al. | |
| 2006/0115181 A1* | 6/2006 | Deng et al. | 382/284 |
| 2006/0215930 A1 | 9/2006 | Terui | |
| 2006/0224997 A1 | 10/2006 | Wong et al. | |
| 2006/0268130 A1 | 11/2006 | Williams et al. | |
| 2006/0291747 A1 | 12/2006 | Peterson | |
| 2007/0019882 A1 | 1/2007 | Tanaka et al. | |
| 2007/0025723 A1 | 2/2007 | Baudisch | |
| 2007/0081081 A1 | 4/2007 | Cheng | |
| 2007/0097266 A1 | 5/2007 | Souchard | |
| 2007/0236513 A1 | 10/2007 | Hedenstroem et al. | |
| 2007/0237421 A1 | 10/2007 | Luo et al. | |
| 2007/0237423 A1 | 10/2007 | Tico | |
| 2007/0258656 A1 | 11/2007 | Arabi | |
| 2008/0056612 A1 | 3/2008 | Park | |
| 2008/0215286 A1 | 9/2008 | Mealy | |
| 2009/0021576 A1 | 1/2009 | Linder | |
| 2009/0058989 A1 | 3/2009 | Kim | |
| 2009/0190803 A1 | 7/2009 | Neghina | |
| 2009/0208062 A1 | 8/2009 | Sorek et al. | |
| 2009/0231447 A1 | 9/2009 | Paik et al. | |
| 2009/0244404 A1 | 10/2009 | Park | |
| 2010/0053303 A1 | 3/2010 | Hayashi | |
| 2010/0054628 A1 | 3/2010 | Levy | |
| 2010/0097442 A1 | 4/2010 | Lablans | |
| 2010/0141737 A1* | 6/2010 | Li et al. | 348/36 |
| 2010/0165087 A1 | 7/2010 | Corso | |
| 2010/0188579 A1 | 7/2010 | Friedman | |
| 2010/0309336 A1 | 12/2010 | Brunner | |
| 2010/0328512 A1 | 12/2010 | Davidovici | |
| 2011/0002544 A1* | 1/2011 | Oshima | 382/190 |
| 2011/0043604 A1 | 2/2011 | Peleg et al. | |
| 2011/0058015 A1 | 3/2011 | Moriyama | |
| 2011/0110605 A1 | 5/2011 | Cheong | |
| 2011/0116767 A1 | 5/2011 | Souchard | |
| 2011/0129126 A1 | 6/2011 | Begeja | |
| 2011/0141227 A1 | 6/2011 | Bigioi | |
| 2011/0141300 A1 | 6/2011 | Stec | |
| 2011/0157386 A1 | 6/2011 | Ishii | |
| 2011/0216156 A1 | 9/2011 | Bigioi | |
| 2011/0234750 A1 | 9/2011 | Lai | |
| 2011/0267544 A1 | 11/2011 | Mei | |
| 2011/0304688 A1 | 12/2011 | Ge | |
| 2012/0133639 A1 | 5/2012 | Kopf | |
| 2012/0155786 A1 | 6/2012 | Zargarpour | |
| 2012/0169840 A1 | 7/2012 | Yamashita | |
| 2012/0229595 A1 | 9/2012 | Miller | |
| 2012/0263397 A1 | 10/2012 | Kimura | |
| 2012/0274739 A1 | 11/2012 | Li | |
| 2012/0314945 A1 | 12/2012 | Cha | |
| 2013/0004100 A1 | 1/2013 | Putraya | |
| 2013/0033568 A1 | 2/2013 | Kim | |
| 2013/0063555 A1* | 3/2013 | Matsumoto et al. | 348/38 |
| 2013/0236122 A1 | 9/2013 | Drouot | |

FOREIGN PATENT DOCUMENTS

| | | |
|---|---|---|
| EP | 0592136 | 4/1994 |
| EP | 1940152 | 12/2006 |
| EP | 2018049 | 1/2009 |
| WO | 9951027 | 10/1999 |
| WO | 2004049257 | 6/2004 |
| WO | 2006048875 | 5/2006 |
| WO | 2009/094661 | 7/2009 |
| WO | 2010025309 | 3/2010 |
| WO | 2011039904 A1 | 4/2011 |

OTHER PUBLICATIONS

Cha, Joon-Hyuk, et al., "Seamless and Fast Panoramic Image Stitching," 2012 IEEE International Conference on Consumer Electronics (ICCE), pp. 29-30.

Efros, Alexei. "Image Blending and Compositing." Computational Photography, CMU, Fall 2010. pp. 1-82.

Levin, Anat, Assaf Zomet, Shmuel Peleg and Yair Weiss. "Seamless Image Stitching in the Gradient Domain." Proc. of the European Conference on Computer Vision (ECCV). Prague. May 2004. pp. 1-12.

McCann, James, Nancy S. Pollard. "Real-Time Gradient-Domain Painting." Computer Science Department, http://repository.cmu.edu/compsci/1257.

Methods of Adaptive Image Blending and Artifacts Masking for Panorama Creation. Apple. Inc. Camera Algorithm Team. Technical Report TR-2012-001.

Perez, P., Gangnet, M., and Blake, A., 'Poisson Image Editing,' ACM Transactions on Graphics (TOG) Proceedings of ACM SIGGRAPH 2003, vol. 22, iss. 3, pp. 313-318, Jul. 2003.

Yingen Xiong and Kari Pulli, "Fast Panorama Stitching for High-Quality Panoramic Images on Mobile Phones," IEEE Transactions on Consumer Electronics, vol. 56, pp. 298-306 (2010).

International Search Report and Search Opinion for PCT Application No. PCT/US2012/033010, dated May 17, 2012, 9 pages.

U.S. Appl. No. 13/109,875, filed May 17, 2011, Bhogal et al.
U.S. Appl. No. 13/109,878, filed May 17, 2011, Doepke et al.
U.S. Appl. No. 13/109,883, filed May 17, 2011, Doepke et al.
U.S. Appl. No. 13/109,889, filed May 17, 2011, Doepke et al.
U.S. Appl. No. 13/109,941, filed May 17, 2011, Doepke et al.

"Panoramic Image Projections", http://www.cambridgeincolour.com/tutorials/image-projections.htm, 9 pages, May 12, 2011.

"Photo Stitching Digital Panoramas", http://www.cambridgeincolour.com/tutorials/digital-panoramas.htm, 11 pages, May 12, 2011.

"Using Photo Stitching Software", http://www.cambridgeincolour.com/tutorials/photo-stitching-software.htm, 9 pages, May 12, 2011.

Josh, Neel, et al., "Image Deblurring using Inertial Measurement Sensors", ACM SIGGRAPH, New York, NY, 8 pages, Jul. 2010.

PCT Search Report and Search Opinion for PCT Application No. PCT/US2012/034625, dated Jul. 31, 2012, 10 pages.

International Search Report and Search Opinion for PCT Application No. PCT/US2012/033010, Dated Jun. 19, 2012, 9 pages.

* cited by examiner

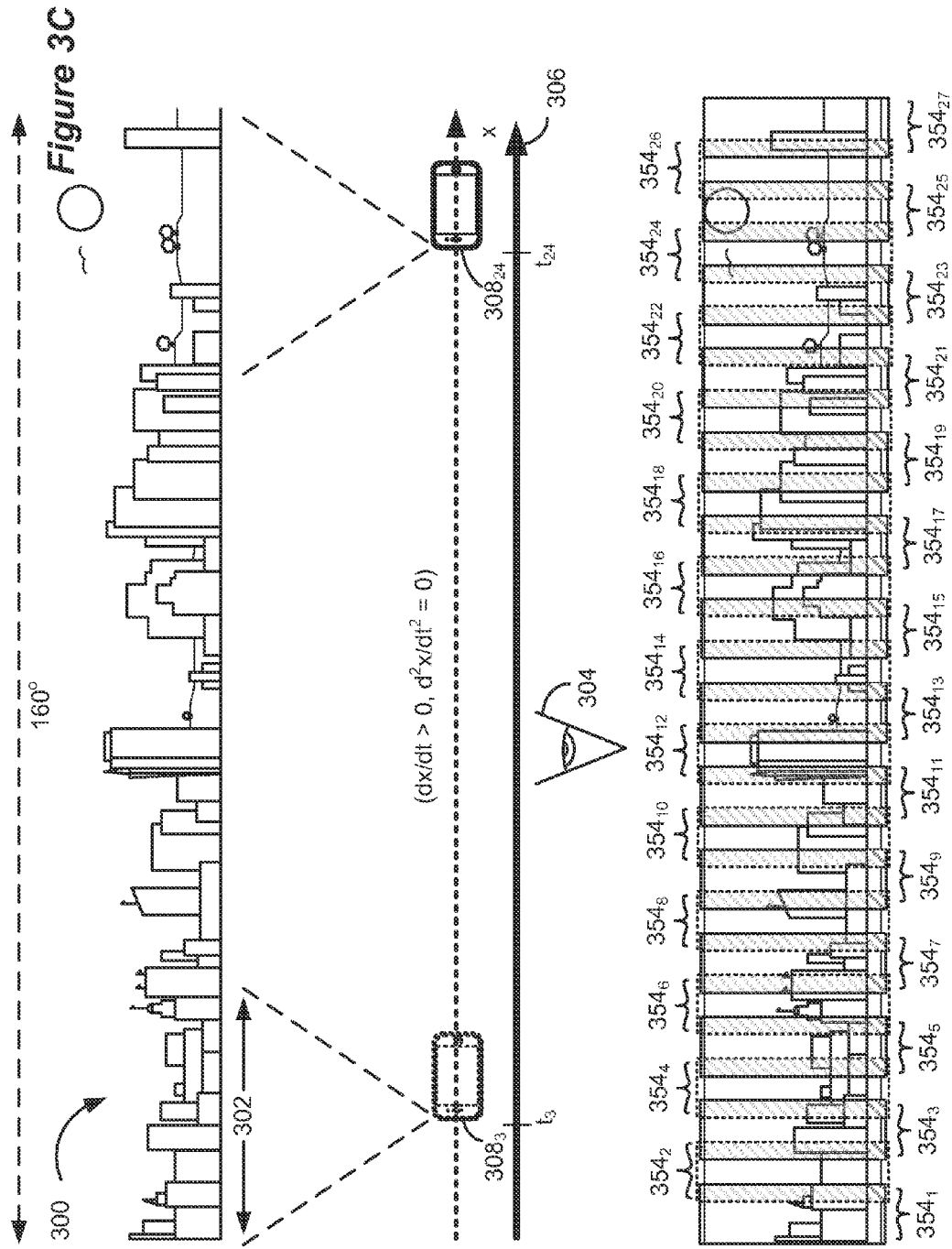

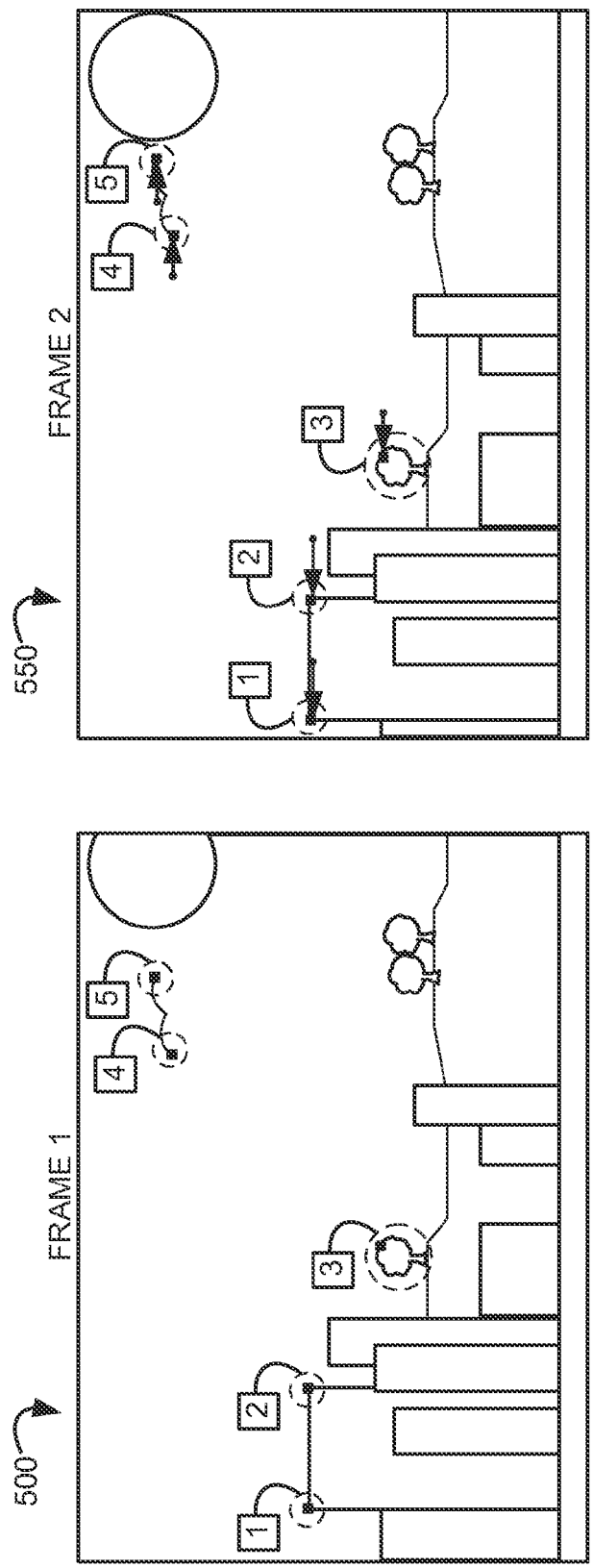

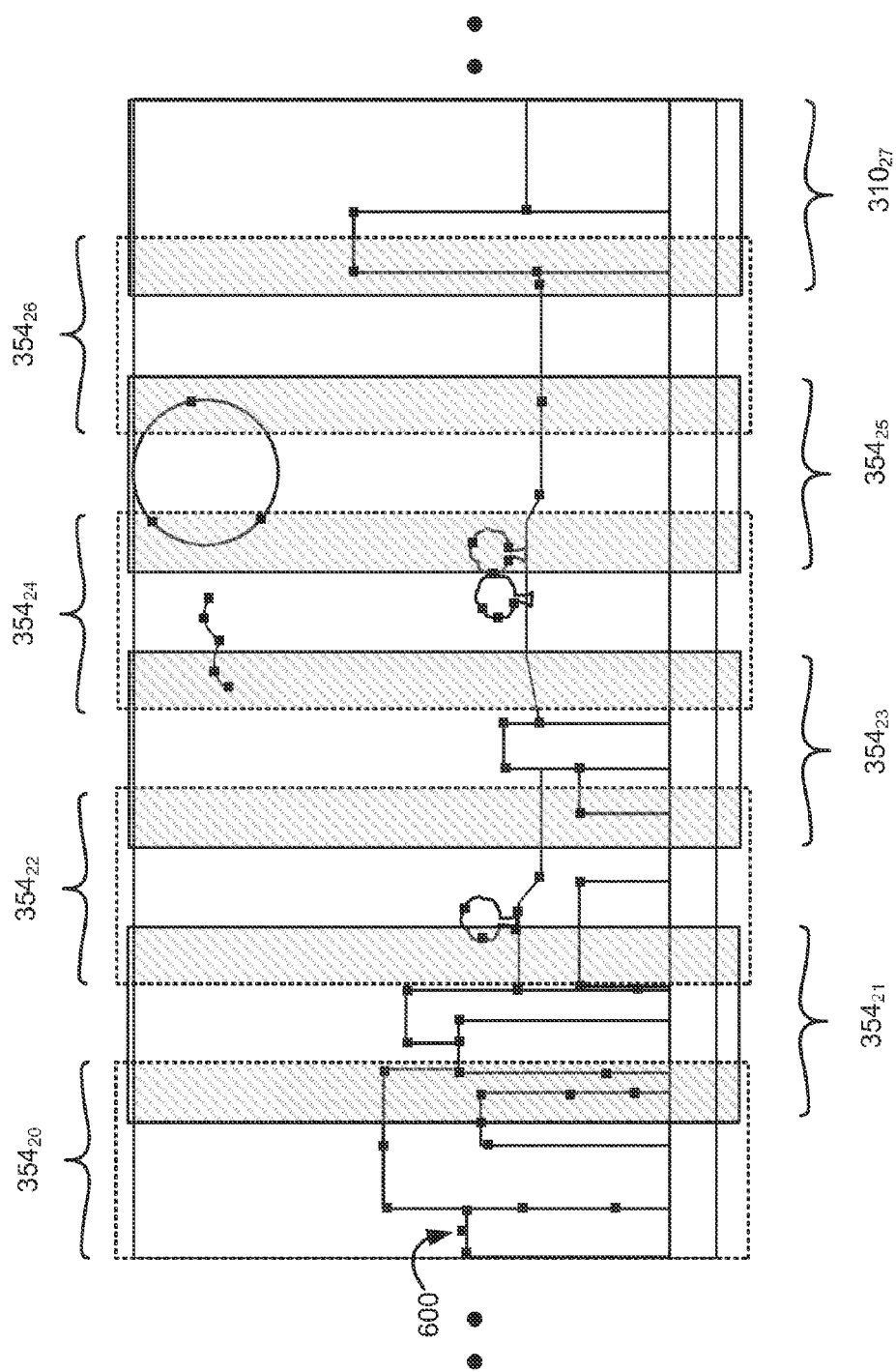

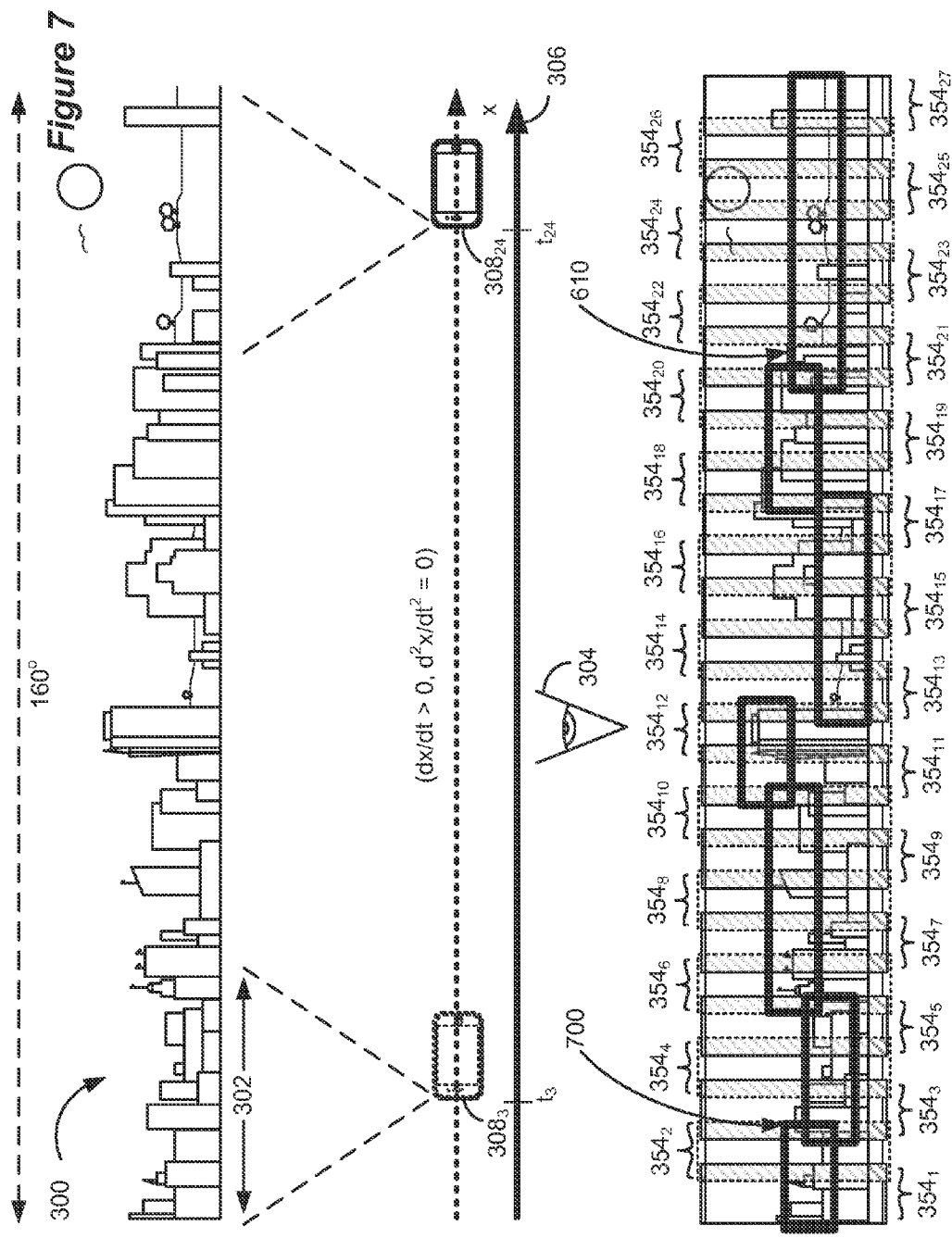

IMAGE REGISTRATION USING SLIDING REGISTRATION WINDOWS

CROSS-REFERENCE TO RELATED APPLICATIONS

This application is related to commonly-assigned applications having U.S. patent application Ser. Nos. 13/109,875, 13/109,878, 13/109,883, 13/109,889, and 13/109,941, each of which applications was filed on May 17, 2011, and each of which is hereby incorporated by reference in its entirety.

BACKGROUND

The disclosed embodiments relate generally to image processing. More specifically, the disclosed embodiments relate to techniques for registering two or more images so that they may be combined or "stitched" together. By way of example, the disclosed embodiment id directed to providing real-time panoramic photography image registration for handheld personal electronic devices with image sensors.

Panoramic photography may be defined generally as a photographic technique for capturing images with elongated fields of view. An image showing a field of view approximating, or greater than, that of the human eye, e.g., about 120° wide by 75° high, may be termed "panoramic." Thus, panoramic images generally (but not always) have an aspect ratio of 2:1 or larger, meaning that the image is at least twice as wide as it is high (or, conversely, twice as high as it is wide, in the case of vertical panoramic images). In some embodiments, panoramic images may even cover fields of view of up to 360 degrees, i.e., a "full rotation" panoramic image.

There are many challenges associated with taking visually appealing panoramic images. These challenges include photographic problems such as: difficulty in determining appropriate exposure settings caused by differences in lighting conditions across the panoramic scene; blurring across the seams of images caused by the motion of objects within the panoramic scene; and parallax problems, i.e., problems caused by the apparent displacement or difference in the apparent position of an object in the panoramic scene in consecutive captured images due to rotation of the camera about an axis other than its center of perspective (COP). The COP may be thought of as the point where the lines of sight viewed by the camera converge. The COP is also sometimes referred to as the "entrance pupil." Depending on the camera's lens design, the entrance pupil location on the optical axis of the camera may be behind, within, or even in front of the lens system. It usually requires some amount of pre-capture experimentation, as well as the use of a rotatable tripod arrangement with a camera sliding assembly to ensure that a camera is rotated about its COP during the capture of a panoramic scene. This type of preparation and calculation is not desirable in the world of handheld, personal electronic devices and ad-hoc panoramic image capturing.

Other challenges associated with taking visually appealing panoramic images include post-processing problems such as: properly aligning the various images used to construct the overall panoramic image (referred to herein as "image registration"); blending between the overlapping regions of various images used to construct the overall panoramic image; choosing an image projection correction (e.g., rectangular, cylindrical, Mercator) that does not distort photographically important parts of the panoramic photograph; and correcting for perspective changes between subsequently captured images.

Heretofore, panoramic photography systems have been unable to provide meaningful real-time or near-real-time panoramic image registration on full resolution image data captured during a panoramic sweep. This has been due, at least in part, to the onerous processing burden imposed by the feature detection and cross-correlation algorithms typically used to register the full resolution captured panoramic image portions.

Accordingly, there is a need for techniques to improve image registration performance during the capture and processing of full resolution (or otherwise high resolution) photographs, especially in the context of panoramic image processing on handheld, personal electronic devices such as mobile phones, personal data assistants (PDAs), portable music players, digital cameras, as well as laptop and tablet computer systems. By employing an intelligent sliding registration window scheme, and optionally leveraging a maximized energy function and feature caching, more effective panoramic photography image registration techniques, such as those described herein, may be employed to achieve real-time or near-real-time image registration of full resolution panoramic images.

SUMMARY

The digital image processing techniques disclosed herein may be used during image registration operations. As such, the disclosed techniques may be used to register any two (or more) images such as, for example, during panoramic image processing and high dynamic range (HDR) operations. By way of introducing this general concept, the following describes how a sliding window registration technique in accordance with one embodiment may be applied to real-time panoramic photography. More specifically, the techniques described herein provide for intelligent full resolution image registration during the panoramic image capture.

As discussed above, image registration may be employed to determine how best to align two images or to approximate the relative displacement of common objects or features from one image to another image. Various techniques may be used to acquire the image registration information. Commonly used techniques include cross-correlation and feature detection algorithms, such as KLT, FAST or SIFT. In some embodiments, feature detection algorithms are preferred, as they are more sensitive than cross-correlation algorithms. Each of the various image registration algorithms have processing costs that are proportional to the size of the image being registered, i.e., the number of pixels that have to be processed. Thus, performance of these algorithms may become a particular issue in real-time or near-real-time systems, such as the panoramic photography systems described herein, where the image processing has to keep pace with the image capturing being done by the camera.

Due to the large amount of image data in the overlapping regions between consecutively processed image portions in panoramic photography systems, novel and inventive techniques have been applied by the inventors to optimize the processing and allow a device to perform near-real-time and real-time full-resolution panoramic image registration. In one embodiment, the panoramic image stitching process uses intelligent sliding registration windows. In another embodiment, the panoramic image stitching process also leverages a maximized energy function and feature caching. Some of the techniques involved in performing image registration and stitching using sliding registration windows are described in greater detail under the section sub-headings below.

Image Acquisition.

Some modern cameras' image sensors may capture image frames at the rate of 30 frames per second (fps), that is, one frame every approximately 0.03 seconds. At this high rate of image capture, and given the panning speed of the average panoramic photograph taken by a user, much of the image data captured by the image sensor is redundant, i.e., overlapping with image data in a subsequently or previously captured image frame. In fact, as will be described in further detail below, in some embodiments it may be advantageous to retain only a narrow "slit" or "slice" of each image frame after it has been captured. In some embodiments, the slit may comprise only the central 12.5% of the image frame. So long as there retains a sufficient amount of overlap between consecutively captured image slits, the image registration techniques described herein are still able to create a visually pleasing panoramic result, while operating with increased efficiency due to the large amounts of unnecessary and/or redundant data that may be discarded. Modern image sensors may capture both low dynamic range (LDR) and high dynamic range (HDR) images, and the techniques described herein may be applied to each.

Image Portion Selection.

As mentioned above, the performance of image registration algorithms is directly correlated to the amount of data being operated upon. Thus, in some embodiments, only a central portion, e.g., a narrow "slit" or "slice," of each image frame need be utilized in the construction of the resultant panoramic image. The use of a central portion of the image frame may be a more advantageous way to reduce the amount of pixels being operated on than simply scaling down the image because scaling down the image may cause the image registration process to lose accuracy, e.g., due to features in the image being eliminated or altered in the scaling down process. Thus, a better solution may be to use only a sub-region of the image to do the image registration. This sub-region will be referred to herein as an "image registration window." In one embodiment of a panoramic photography system, the image slices may have dimensions of 2592 pixels by 480 pixels. In such an embodiment, the image registration window may preferably have dimensions that are equal in width, but only one-fourth the height (e.g., 640 pixels by 480 pixels) of the entire image slice being registered—effectively cutting the processing costs of image registration by a factor of four. The pixels within the image registration window may be referred to herein as a "candidate portion of pixels," i.e., the subset of pixels that are candidates to be used in the registration process. In one embodiment, the candidate portion of pixels may be made up of pixels from each of a subset of the rows in the image. Thus, the accuracy of the image registration process may be preserved, but an optimal placement for the image registration window in the image slice may still need to be determined to further enhance the efficiency of the image registration process.

Energy Functions.

As mentioned above, finding the acceptable placement for the image registration window in the image slice may be critical to optimizing the efficiency of the image registration process. For example, suppose the image registration window is initially placed at the top of the image slice. In many images, e.g., images taken outdoors, the top of the image may consist only of the sky, which is essentially without features. If instead, the image registration window were placed in the middle of the image slice, there may be a blank wall. Likewise, if the image registration window were placed at the bottom of the image slice, it might be in an area in the image where there is just a smooth ground surface. It is most advantageous to put the image registration window where there is the most "energy." The term energy, as used herein, may be synonymous with the concept of contrast in image processing parlance. For example, areas within the image with the greatest amount of contrast typically coincide with areas having identifiable features or pixel patterns that can be used by feature detection or cross-correlation algorithms, respectively, to perform image registration.

To keep up with the real-time capture of image data by the device, however, the image registration process cannot spend a lot of time determining where the location of maximum energy is in the image slice, otherwise the processing savings of using the small registration window may be negated. Thus in one embodiment of an image registration process described herein, the energy is determined by examining only the first 16-pixel column at the edge of the image slice. The energy in the first 16 pixels of each row may then be summed over the height of the image registration window to produce an overall energy score for the image registration window at its current location. Next, the image registration window may slide one row at a time down the length of the image slice, calculating an overall energy score for each position of the image registration window. With this analysis complete, the optimal placement of the image registration window (i.e., the location having the maximum energy score) is known, and the sliding image registration window may be placed there for the current image slice. It will be recognized that other energy functions may be used. It has been found that selection of a particular energy function may be a factor of the particular feature detector being used by the imaging system.

Feature Caching.

Once an acceptable or optimal placement for the image registration window has been determined, the chosen image registration algorithm may be carried out over only pixels within the image registration window. To further optimize the process, the output of the feature detection algorithm run over the pixels within the image registration window may be cached. For example, after registering hypothetical image slices A and B, the process may utilize the cache to store the features found in slice B when it was registered with slice A. Thus, when image slices B and C are registered, if the image registration window remains at the same location, the feature detector does not have to be run on slice B again, only on slice C, thus saving time and processor resources. However, when the image registration window slides between the A-B pair and the B-C pair (e.g., due to a new "maximum" energy location), the feature detection would need to be re-run on slice B with the new placement of the image registration window. This is more processor expensive than using the cached feature list, but it is still computationally cheaper than performing image registration over the full image slice.

Registration Window "Inertia."

As mentioned above under the "Feature Caching" sub-heading, when the image registration window slides between consecutive pairs of image slices being registered, there is an additional computational burden associated with re-running the feature detection or cross-correlation at a new location on one of the slices. Thus, in one embodiment of an intelligent image stitching system using sliding image registration window, one or more threshold metrics may be determined such that the registration process may attempt to avoid sliding the registration window between consecutive pairs of image slices as much as possible.

For example, often, the energy peak moves around between consecutive pairs of image slices, but the energy in the image registration window for the first pair of image slices to be registered is still good enough to use for the registration of the second pair of image slices to be registered. Therefore, in one embodiment, a new image registration window position is used only if the following two criteria are met: (1) the new image registration window position has moved at least N pixels from the old location; and (2) the energy of the old location is below a certain threshold in the new slice. By ensuring that certain criteria are met before sliding the image registration window, it may be ensured that a minimum amount of processing work is done while still providing robust image registration.

Thus, in one embodiment, an image registration method is disclosed comprising: storing a first image in a first memory, the first image having a first number of rows of pixels, each row of pixels having a second number of pixels; storing a second image in a second memory, the second image having the first number of rows of pixels, wherein each row of pixels in the second image has the second number of pixels, and wherein each pixel in the second image has a corresponding pixel in the first image; identifying a first candidate portion of pixels in the second image, the first candidate portion of pixels indicative of one or more features in the second image, the first candidate portion of pixels comprising pixels from each of a subset of the rows in the second image; identifying a first portion of pixels in the first image based on the first candidate portion of the second image, each pixel in the first portion of the first image having a corresponding pixel in the first candidate portion of pixels in the second image; and registering the first image and the second image using only the first candidate portion of pixels in the second image and the corresponding pixels in the first portion of the first image.

In another embodiment described herein, an image registration method is disclosed comprising: receiving a plurality of image portions from an image stream captured by an image sensor of a device, each image portion comprising a first plurality of pixels; and for each successive image portion received: evaluating an energy function over the image portion to locate a maximum energy location; placing an image registration window over the image portion at the located maximum energy location, wherein the image registration window comprises a second plurality of pixels, and wherein the second plurality of pixels is smaller than the first plurality of pixels; and registering the image portion with a preceding received image portion, wherein the act of registering uses only the second plurality of pixels and a corresponding third plurality of pixels from the preceding received image portion, and wherein the third plurality of pixels is located at a location in the preceding received image portion that corresponds to the located maximum energy location.

Panoramic photography image registration techniques for handheld personal electronic devices in accordance with the various embodiments described herein may be implemented directly by a device's hardware and/or software, thus making these robust panoramic photography image registration techniques readily applicable to any number of electronic devices with appropriate positional sensors and processing capabilities, such as mobile phones, personal data assistants (PDAs), portable music players, digital cameras, as well as laptop and tablet computer systems.

BRIEF DESCRIPTION OF THE DRAWINGS

FIG. 3C illustrates an exemplary panoramic scene assembled from image portions, in accordance with one embodiment.

FIG. 5 illustrates image registration techniques utilizing feature detection, according to one embodiment.

FIG. 6A illustrates exemplary features located in a sequence of image portions, according to one embodiment.

FIG. 7 illustrates the movement of a sliding image registration window during the capture of an exemplary panoramic scene assembled from image portions, in accordance with one embodiment.

DETAILED DESCRIPTION

This disclosure pertains to devices, methods, and computer readable media for performing real-time or near-real-time image registration in the context of digital image photography. A few generalized steps may be used to carry out the image registration techniques described herein: 1) acquiring image data from an image sensor; 2) selecting a pair of overlapping image portions from the acquired image data for registration; 3) determining an area of "maximum energy" in one of the image portions being registered; 4) placing an image registration window over both image portions at the determined location of maximum energy; 5) registering the overlapping image portions using only the image data falling within the image registration windows; and 6) determining, according to one or more metrics, whether the image registration window should be shifted from its current location before registering subsequently acquired image portions.

The techniques disclosed herein are applicable to any number of electronic devices with optical sensors such as digital cameras, digital video cameras, mobile phones, personal data assistants (PDAs), portable music players, as well as laptop, desktop, workstations, and tablet computer systems.

In the interest of clarity, not all features of an actual implementation are described in this specification. It will of course be appreciated that in the development of any such actual implementation (as in any development project), numerous decisions must be made to achieve the developers' specific goals (e.g., compliance with system- and business-related constraints), and that these goals will vary from one implementation to another. It will be further appreciated that such development effort might be complex and time-consuming, but would nevertheless be a routine undertaking for those of ordinary skill having the benefit of this disclosure.

In the following description, for purposes of explanation, numerous specific details are set forth in order to provide a thorough understanding of the inventive concept. As part of the description, some structures and devices may be shown in block diagram form in order to avoid obscuring the invention. Moreover, the language used in this disclosure has been principally selected for readability and instructional purposes, and may not have been selected to delineate or circumscribe the inventive subject matter, resort to the claims being necessary to determine such inventive subject matter. Reference in the specification to "one embodiment" or to "an embodiment" means that a particular feature, structure, or characteristic described in connection with the embodiments is included in at least one embodiment of the invention, and multiple references to "one embodiment" or "an embodiment" should not be understood as necessarily all referring to the same embodiment.

Figure 1:
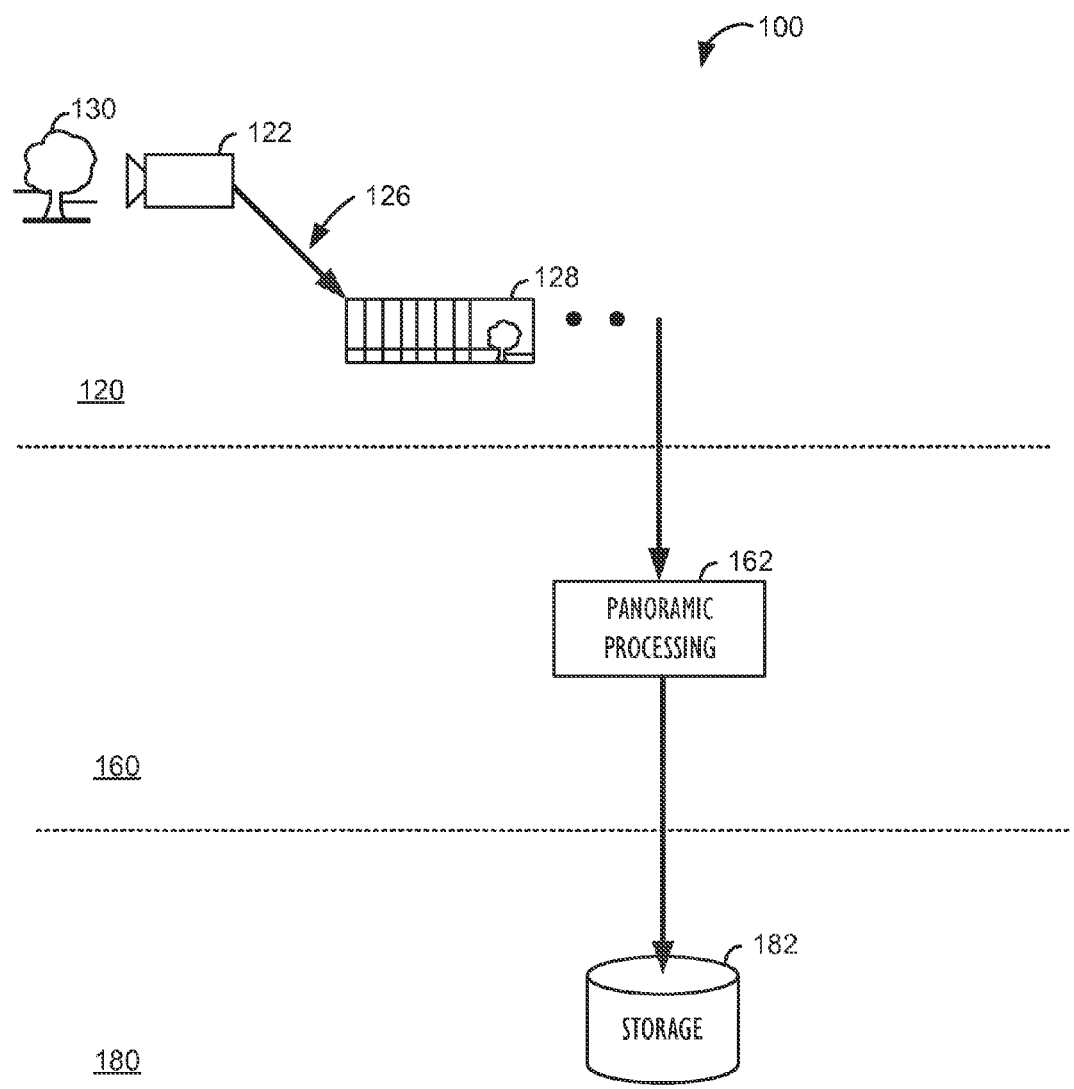
FIG. 1 illustrates a system for panoramic photography, in accordance with one embodiment.

Referring now to FIG. 1, a system 15 for registering images in the context of panoramic photography is shown, in accordance with one embodiment. The system 15 as depicted in FIG. 1 may be logically broken into three separate layers. Such layers are presented simply as a way to logically organize the functions of the panoramic photography system. In practice, the various layers could be within the same device or spread across multiple devices. Alternately, some layers may not be present at all in some embodiments.

Camera layer 120 comprises a personal electronic device 122 possessing one or more image sensors capable of capturing a stream of image data 126, e.g., in the form of an image stream or video stream of individual image frames 128. In some embodiments, images may be captured by an image sensor of the device 122 at the rate of 30 fps. As shown in the image frames 128 in image stream 126, tree object 17 has been captured by device 122 as it panned across the panoramic scene. Solid arrows in FIG. 1 represent the movement of image data.

Panoramic Processing Layer 160 is described in general terms. As mentioned above, the system 15 may possess panoramic processing module 162 which receives as input the image stream 128 from the Camera Layer 120. The panoramic processing module 162 may preferably reside at the level of an application running in the operating system of device 122. Panoramic processing module 162 may perform such tasks as: image registration, geometric correction, alignment, and "stitching" or blending. Finally, the panoramic processing module 162 may optionally crop the final panoramic image before sending it to Storage Layer 180 for permanent or temporary storage in storage unit 182. Storage unit 182 may comprise, for example, one or more different types of memory, for example, cache, ROM, and/or RAM.

The device executing the panoramic photography process may possess certain positional sensors. Positional sensors may comprise, for example, a MEMS gyroscope, which allows for the calculation of the rotational change of the camera device from frame to frame, or a MEMS accelerometer, such as an ultra compact low-power three axes linear accelerometer. An accelerometer may include a sensing element and an integrated circuit (IC) interface able to provide the measured acceleration of the device through a serial interface. A motion filter module in communication with the device executing the panoramic photography process may receive input from the positional sensors of the device. Information received from positional sensors may be used by the motion filter module to make a determination of which image frames 128 in image stream 126 will be needed to efficiently construct the resultant panoramic scene. In some embodiments, the motion filter may keep only one of every roughly three image frames 128 captured by the image sensor of device 122, thus reducing the memory footprint of the process by two-thirds. By eliminating redundant image data in an intelligent and efficient manner, e.g., driven by positional information received from device 122's positional sensors, the motion filter module may be able to filter out a sufficient amount of extraneous image data such that the Panoramic Processing Layer 160 receives image frames having ideal overlap and is able to perform panoramic processing on high resolution and/or low resolution versions of the image data in real-time, optionally displaying the panoramic image to a display screen of device 122 as it is being assembled in real-time. Motion filtering techniques are described in greater detail in U.S. patent application Ser. No. 13/109,883, which was incorporated by reference above.

Figure 2:
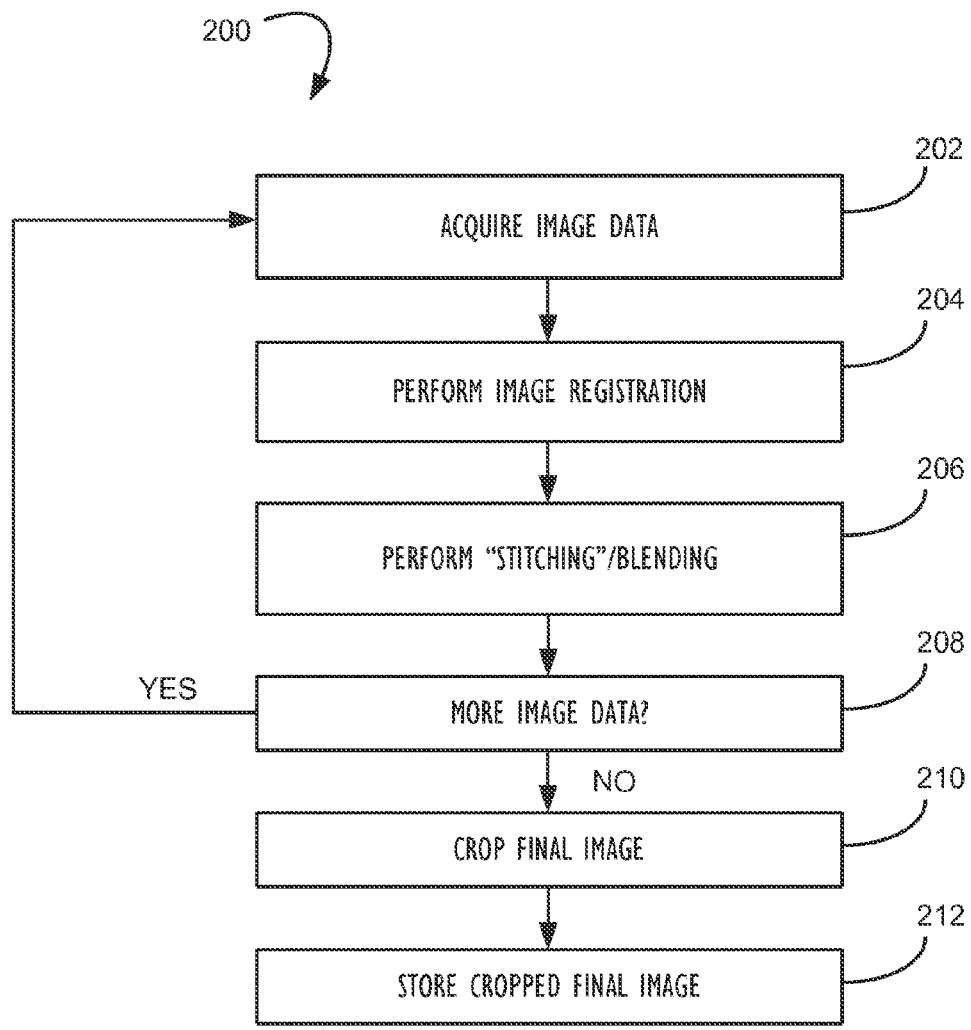
FIG. 2 illustrates a process for creating panoramic images, in accordance with one embodiment.

Referring now to FIG. 2, an illustrative process 24 for creating panoramic images in accordance with one embodiment is shown at a high level in flow chart form. First, an electronic device, e.g., a handheld personal electronic device comprising one or more image sensors, captures image data using one or more of its image sensors, wherein the captured image data may take the form of an image stream of image frames (Step 25). After optionally performing motion filtering to discard redundant image data, the process 24 may attempt to perform image registration between overlapping captured image frames from the image stream (Step 26). In addition to the techniques described herein, the image registration process may be streamlined and made more efficient via the use of information received from positional sensors within the device, as is explained in further detail in the U.S. patent application Ser. No. 13/109,889. Next, the panoramic image process 24 may perform "stitching" and/or blending of the acquired image data (Step 27). If more image data remains to be appended to the resultant panoramic image (Step 208), the process may return to Step 25 and run through the process 24 to acquire the next image frame portion that is to be processed and appended to the panoramic image. If instead, no further image data remains at Step 208, the final image may optionally be cropped (Step 210) and/or stored into some form of volatile or non-volatile memory (Step 212). It should also be noted that Step 25, the image acquisition step, may in actuality be happening continuously during the panoramic image capture process, i.e., concurrently with the performance of Steps 26-208. Thus, FIG. 2 is for illustrative purposes only, and not to suggest that the act of capturing image data is a discrete event that ceases during the performance of Steps 26-208. Image acquisition continues until Step 210 when either the user of the camera device indicates a desire to stop the panoramic image capture process or when the camera device runs out of free memory allocated to the process.

Now that the panoramic imaging process has been described at a high level both systemically and procedurally, attention will be turned in greater detail to the process of efficiently and effectively creating panoramic photographs assisted by intelligent sliding image registration windows, as well as optionally leveraging a maximized energy function and feature caching.

Figure 3A:
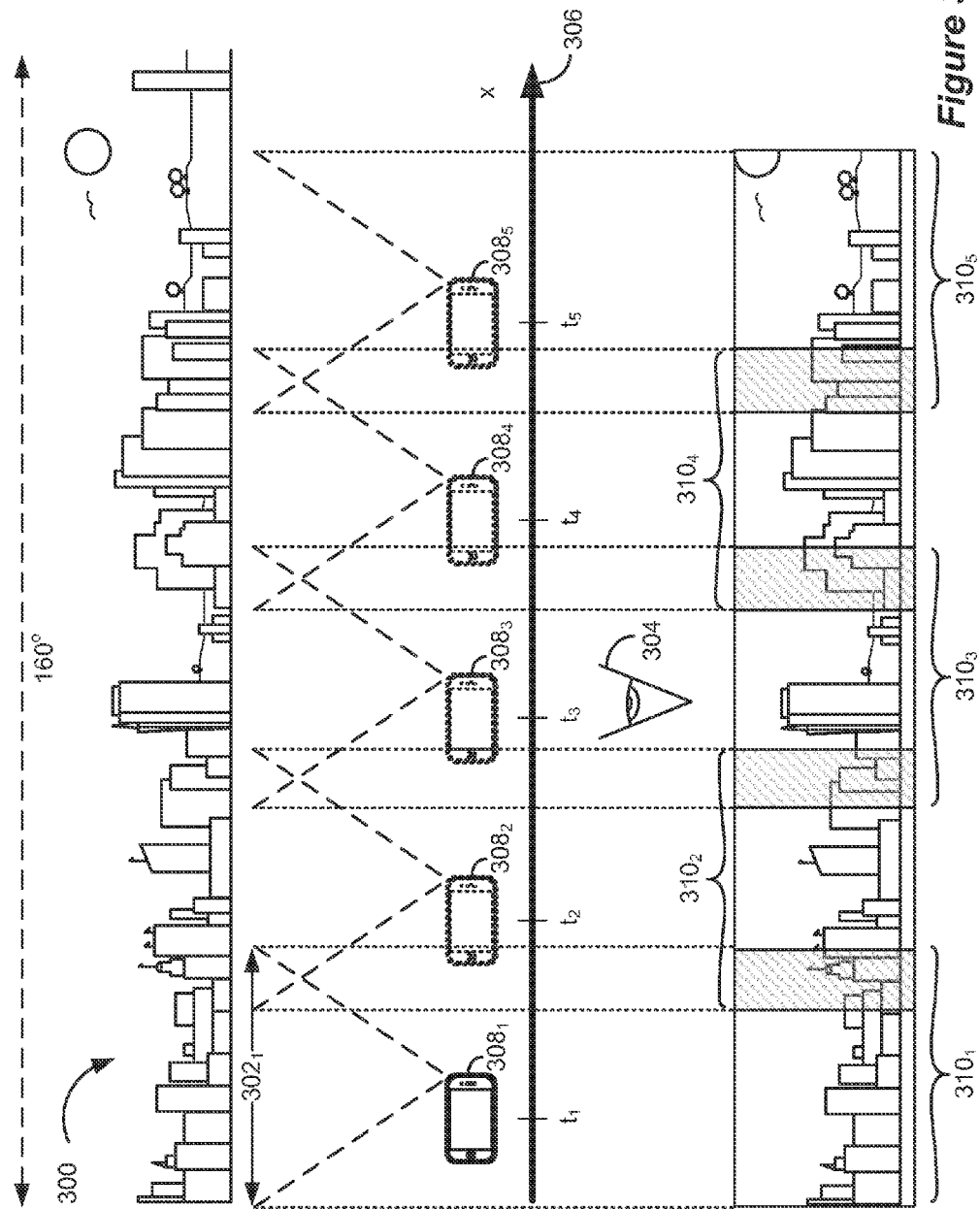
FIG. 3A illustrates an exemplary panoramic scene as captured by an electronic device, in accordance with one embodiment.

Turning now to FIG. 3A, an exemplary panoramic scene 28 is shown as captured by an electronic device 308, according to one embodiment. As shown in FIG. 3A, panoramic scene 28 comprises a series of architectural works including the skyline of a city. City skylines are one example of a wide field of view scene often captured in panoramic photographs. Ideally, a panoramic photograph may depict the scene in approximately the way that the human eye takes in the scene, i.e., with close to a 180 degree field of view. As shown in FIG. 3, panoramic scene 28 comprises a 160 degree field of view.

Axis 306, which is labeled with an 'x,' represents an axis of directional movement of camera device 308 during the capture of panoramic scene 28. As shown in FIG. 3A, camera device 308 is translated to the right with respect to the x-axis over a given time interval, $t_1$-$t_5$, capturing successive images of panoramic scene 28 as it moves along its panoramic path. In other embodiments, panoramic sweeps may involve rotation of the camera device about an axis, or a combination of camera rotation around an axis and camera translation along an axis. As shown by the dashed line versions of camera device 308, during the hypothetical panoramic scene capture illustrated in FIG. 3, camera device 308 will be at position $308_1$ at time $t_1$, and at position $308_2$ at time $t_2$, and so on, until reaching position $308_5$ at time $t_5$, at which point the panoramic path will be completed and the user 304 of camera device 308 will indicate to the device to stop capturing successive images of the panoramic scene 28.

Image frames $310_1$-$310_5$ represent the image frames captured by camera device 308 at the corresponding times and locations during the hypothetical panoramic scene capture illustrated in FIG. 3. That is, image frame $310_1$ corresponds to the image frame captured by camera device 308 while at position $308_1$ and time $t_1$. Notice that camera device 308's field of view while at position $308_1$, labeled $29_1$, combined with the distance between user 304 and the panoramic scene 28 being captured dictates the amount of the panoramic scene that may be captured in a single image frame 310. In traditional panoramic photography, a photographer may take a series of individual photos of a panoramic scene at a number of different set locations, attempting to get complete coverage of the panoramic scene while still allowing for enough overlap between adjacent photographs so that they may be aligned and "stitched" together, e.g., using post-processing software running on a computer or the camera device itself. In some embodiments, a sufficient amount of overlap between adjacent photos is desired such that the post-processing software may determine how the adjacent photos align with each other so that they may then be stitched together and optionally blended in their overlapping region to create the resulting panoramic scene. As shown in FIG. 3A, the individual frames 310 exhibit roughly 25% overlap with adjacent image frames. In some embodiments, more or less offset between adjacent image frames will be desired; with roughly 16-32 pixels of offset between consecutive images preferred, depending on memory and processing constraints of the camera device and image registration algorithms being used.

In the case where camera device 308 is a video capture device, the camera may be capable of capturing 30 or more frames per second. As will be explained in greater detail below, at this rate of capture, much of the image data is redundant, and provides much more overlap between adjacent images than is needed by stitching software to create the resultant panoramic images. As such, by employing motion filtering techniques, the device may be able to intelligently and efficiently determine which captured image frames may be used in the creation of the resulting panoramic image and which captured image frames may be discarded as overly redundant.

Figure 3B:
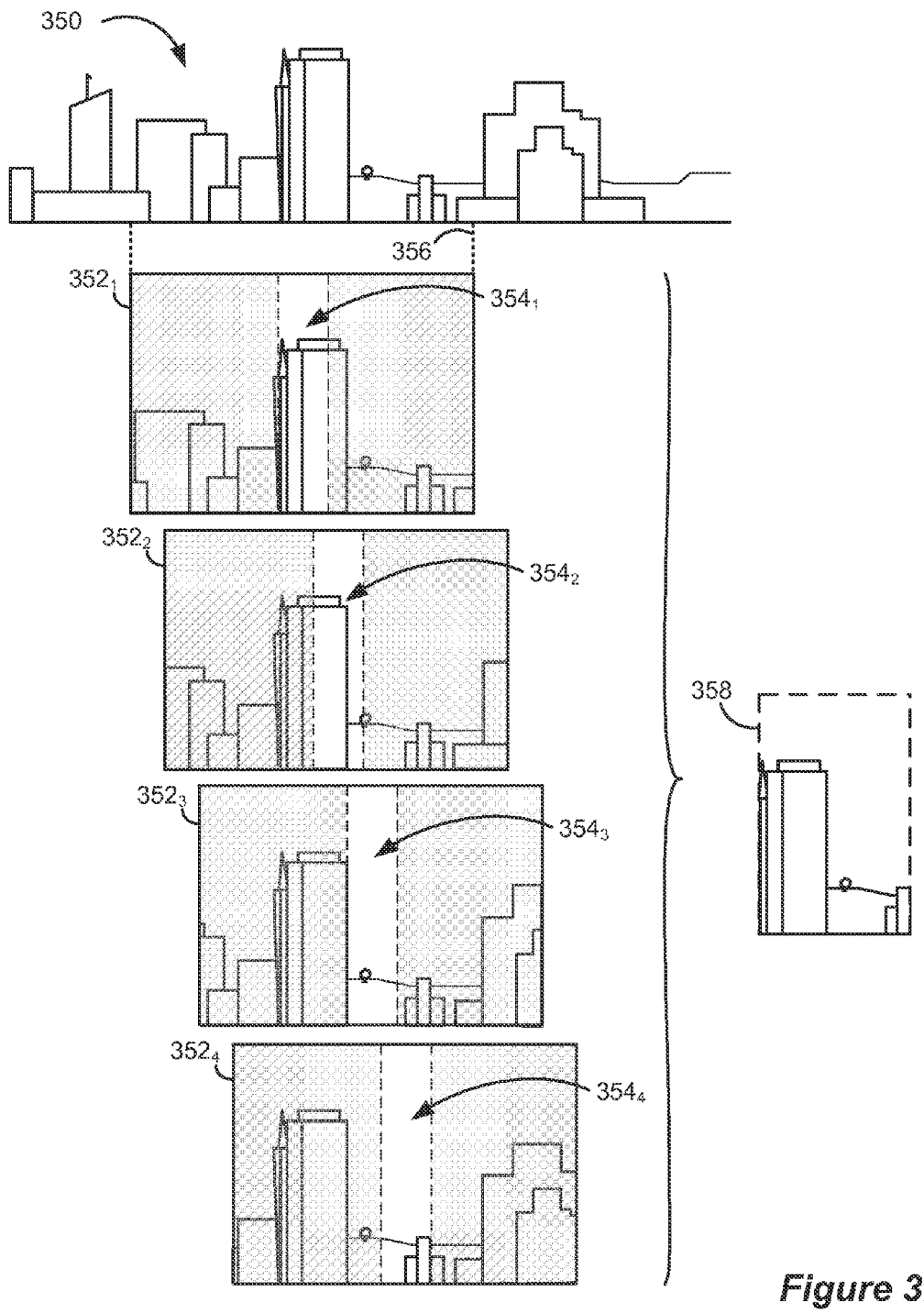
FIG. 3B illustrates image portions, i.e., image "slits" or "slices," in accordance with one embodiment.

Referring now to FIG. 3B, image portions, i.e., image "slits" or "slices," are shown, in accordance with one embodiment. In FIG. 3B, panoramic scene 350 has been captured via a sequence of selected image frames labeled $352_1$-$352_4$. As discussed above with reference to motion filtering, the selected image frames labeled $352_1$-$352_4$ may represent the image frames needed to achieve full coverage of panoramic scene 350. Trace lines 356 indicate the portion of the panoramic scene 350 corresponding to the first captured image frame $352_1$. The central portion 354 of each captured image frame 352 represents the selected image slit or slice that may be used in the construction of the resultant panoramic photograph. As shown in FIG. 3B, the image slits comprise approximately the central 12.5% of the image frame. The shaded areas of the image frames 352 may likewise be discarded as overly redundant of other captured image data. According to one embodiment, each of selected image slits labeled $354_1$-$354_4$ may subsequently be aligned (i.e., registered), stitched together, and blended in their overlapping regions, producing resultant panoramic image portion 358. Potion 358 represents the region of the panoramic scene captured in the four image slits $354_1$-$354_4$. Additionally, by operating on only a portion of each of the image frames, e.g., a central portion of each selected image frame, some optical artifacts such as barrel or pincushion distortions, lens shading, vignetting, etc. (which are more pronounced closer to the edges of a captured image) may be diminished or eliminated altogether. Further, operating on only portions of each selected image frame creates a smaller instantaneous memory footprint for the panoramic photography process, which may become important when assembling a full-resolution panoramic image.

Referring now to FIG. 3C, an exemplary panoramic scene 28 assembled from image portions 354 is shown, in accordance with one embodiment. As shown in FIG. 3C, the resultant panoramic scene comprises 27 image portions, i.e., image slits or image slices, labeled $354_1$-$354_{27}$. Image slices with odd-numbered subscripts are shown with solid outlines, whiles image slices with even-numbered subscripts are shown with dashed line outlines to aid in visually delineating different slices. Overlapping regions between consecutive image slices are shaded in with diagonal lines. The amount of overlap, and thus the width of the diagonally shaded regions may be dependent on the particular image registration algorithms employed by the panoramic photography system, with the smallest possible amount of overlap that still produces satisfactory results being desired so as to limit the amount of processing required during the real-time capture of image data.

In general terms, image registration processes may acquire two images (or image slits) that are to be registered, and then divide each image into a plurality of segments. Through the use of an image registration algorithm involving, e.g., a feature detection or a cross-correlation algorithm, a search vector may be calculated for each segment of the image. A segment search vector may be defined as a vector representative of the transformation that would need to be applied to the segment from the first image to give it its location in the second image. An average search vector for the image portion being analyzed may then be determined and used to apply an appropriate transformation to one of the images being registered so that it may be properly aligned with the other image being registered. Further details about the process of image registration are explained in further detail in the U.S. patent application Ser. No. 13/109,889.

Turning now to FIGS. 4A-4D, a more detailed process 26 for performing image registration for panoramic photography using sliding registration windows is shown in flowchart form, in accordance with one embodiment. Beginning with FIG. 4A, the process 26 begins at Step 400 by acquiring first and second overlapping image portions to be registered. Next, the process 26 may create an image registration window over a sub-region, e.g., one quadrant, for each of the first and second image portions, with the first image registration window located initially at the top of the first image portion and the second image registration window located initially at the top of the second image portion (Step 402). Next, process 26 may evaluate an energy function over the height of the second image registration window at its current location (Step 404). In one embodiment, evaluating the energy function may comprise determining the contrast over a predetermined number of pixels, e.g., 16 pixels, along the edge of the image portion for each row over the height of the image registration window and then summing the contrasts for each row in the image registration window. In one embodiment, the contrast may be defined as the luminance delta between the lightest pixel and the darkest pixel in the row over the predetermined number of pixels along the edge of the image portion. For example, if the image registration window is 15 pixels rows high, and the contrast for each row over the predetermined number of pixels is 25, then the energy sum for the registration window would be 15*25, or 2500. Other energy functions could use a specified number of pixels distributed throughout a row (rather than being contiguous). Yet another energy function could be based on a variance (or sparse variance). In general, functions that provide a high score or value in regions of high spatial frequency tend to be "good" energy functions. And, as noted earlier, for example, the precise energy function that may be most useful may be tailored to the implementation's feature detector function.

Once the energy function has been evaluated at the image registration window's current location, the image registration may be moved down by one row of pixels over the image portion (Step 406). If the bottom of the image portion has not been reached (Step 408), the process returns to Step 404 and evaluates the energy function at the new location of the image registration window. Notice that the contrast need be calculated for only one new row when the window is shifted down by one row (while the contrast total for the previous top row of the image registration window may be discarded). If instead, at Step 408 the bottom of the image portion is reached, the energy function is evaluated one final time (Step 410), at which point the maximum of all the evaluated energy function values over the height of the image portion may be determined (Step 412). The location at which the energy function reached a maximum may then be used to set the location of the second image registration window for the registration of the first and second overlapping image portions. Thus, at Step 414, process 26 may perform feature detection and/or cross-correlation on pixels within the determined location of the second registration window in both first and second image portions. Flow of the process 26 then continues on to FIG. 4B (Step 416).

Figure 4A:
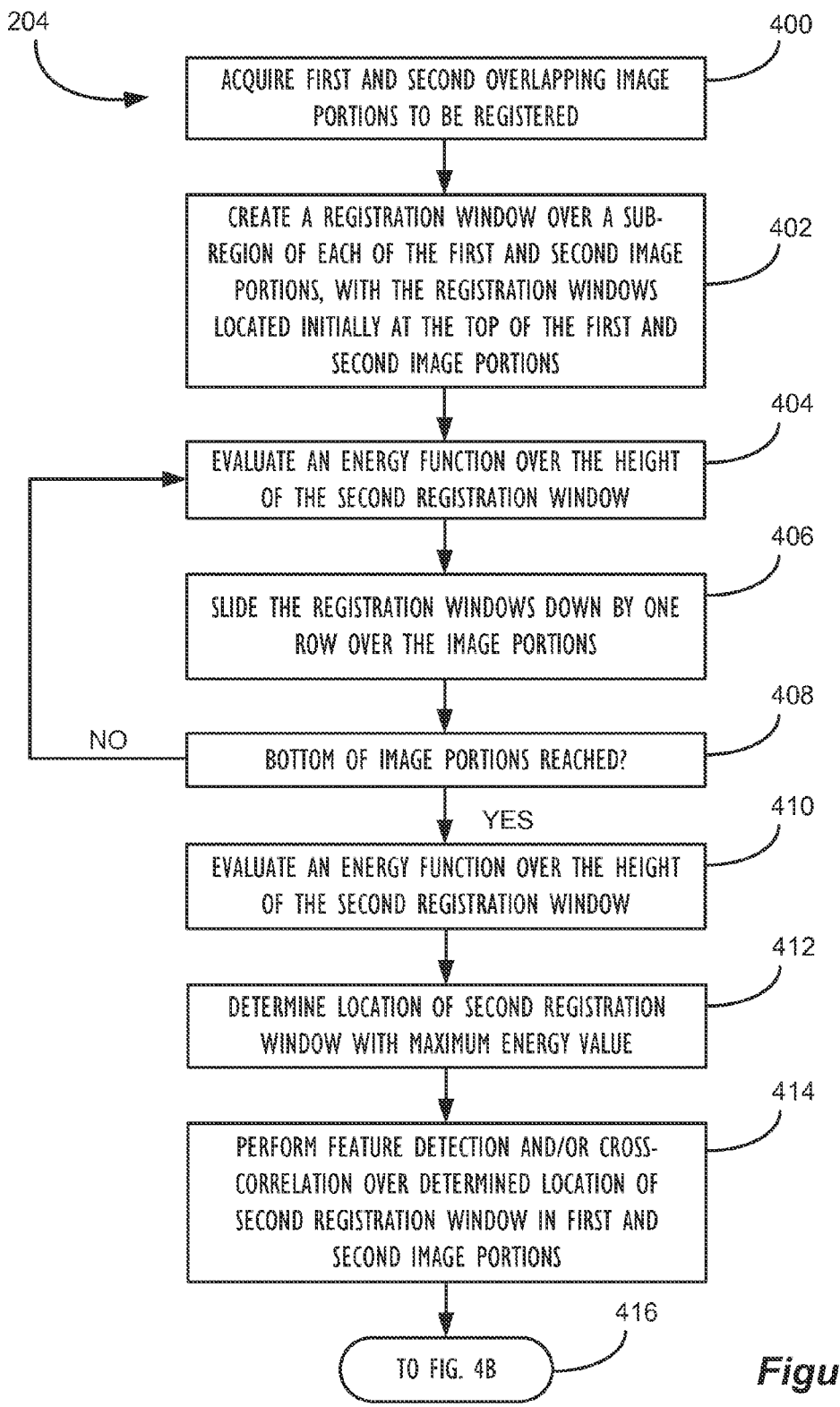
FIGS. 4A-4D illustrate a process for performing image registration for panoramic photography using sliding registration windows, in accordance with one embodiment.
Figure 4B:
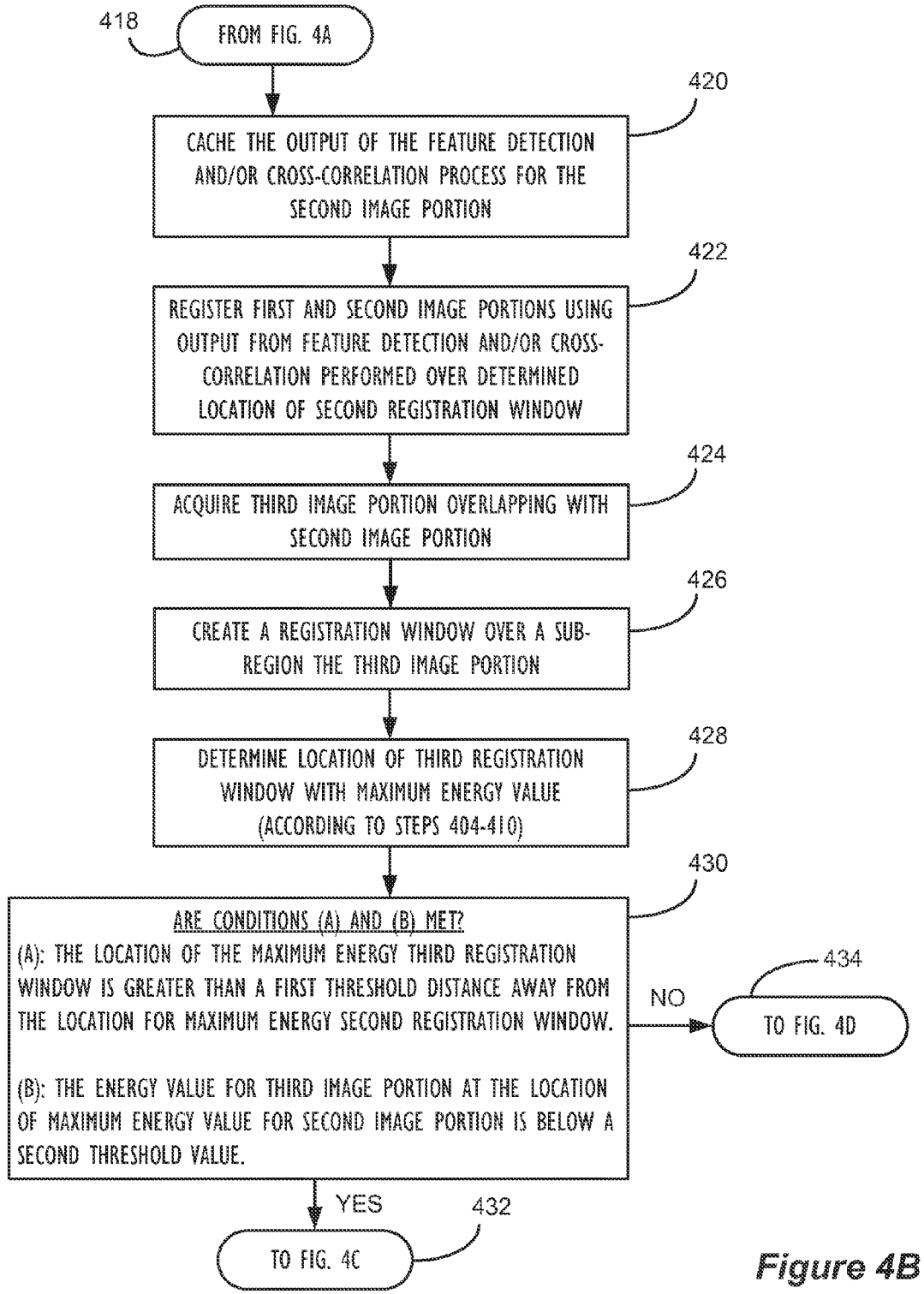

Turning now to FIG. 4B (Step 418), the process 26 may cache the output of the feature detection operation for the second image portion (Step 420). In general, caches may be useful in any application where this process is driven may identifying "characteristics" or "signatures" of images as these may re reused in a subsequent step (see Step 420). Other times that a cache may improve performance is where edges are enhanced prior to performing cross-correlation of the two images, and image pyramids for the image and gradient images for use with the KLT algorithm. Finally, the process 26 may register the first and second image portions using output from the feature detection and/or cross-correlation algorithms performed over the determined location of second registration window (Step 422). At this point, the process 26 will be receiving the next image slice to register, thus a third image portion that overlaps with the second image portion may be acquired (Step 424). Next, at Step 426, an image registration window may be created over a sub-region the third image portion, with the default position being the same as the position that was determined for the second image portion in Step 412. Next, at Step 428, the energy function may be used to determine the location of the image registration window over the third image portion having the maximum energy value (i.e., according to the same process described above in reference to Steps 404-410).

Once the new maximum energy location is determined for the third image portion the process 26 will determine wither the following conditions are both met: (A) the location of the maximum energy third registration window is greater than a first threshold distance away from the location for maximum energy second registration window; and (B) the energy value for third image portion at the location of maximum energy value for second image portion is below a second threshold value. If each of conditions (A) and (B) above are met, the process 26 proceeds to FIG. 4C (Step 432). If instead, both of the conditions (A) and (B) above are not met, the process 26 proceeds to FIG. 4D (Step 434). In one embodiment, the first threshold distance is 25% of the registration window height and the second threshold value is 110% of the energy score. It should be noted that conditions (A) and (B) and the preferred values above have been determined empirically, and in other embodiments, more or fewer conditions may be imposed, and different threshold values may be used.

Figure 4C:
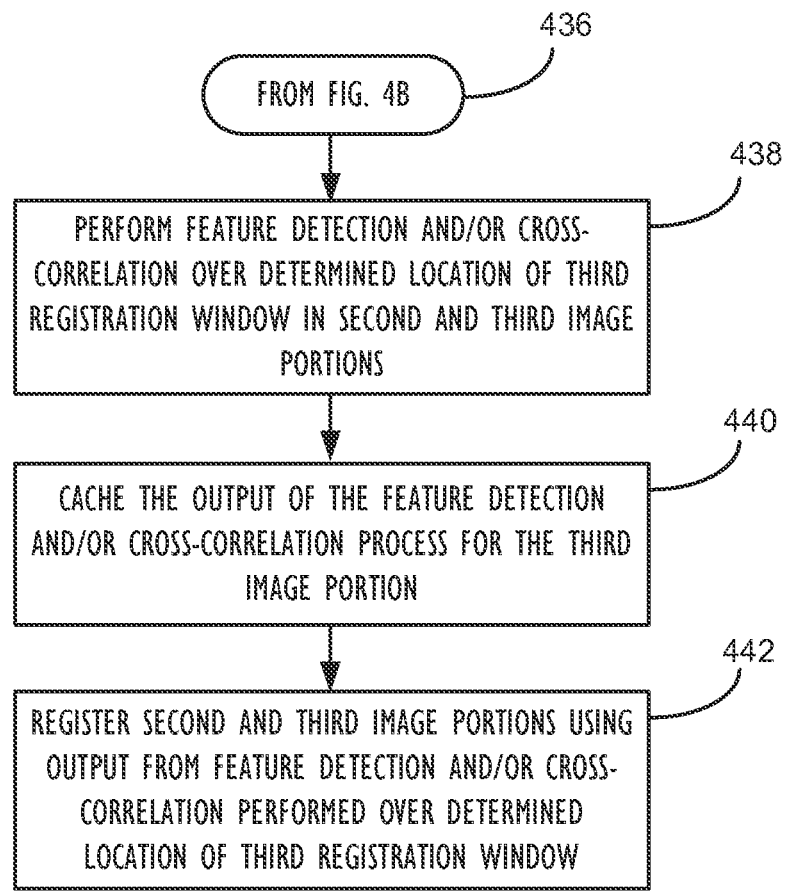

Turning now to FIG. 4C (Step 436), the process 26 may perform feature detection and/or cross-correlation over the determined location of the third registration window in second and third image portions (Step 438). In other words, if the flow of process 26 proceeds to FIG. 4C the "registration window inertia" has been overcome, and the process 26 has determined that, in order to maintain robust image registration, it can be justified from a processing standpoint to move the registration window and perform feature detection and/or cross-correlation on the second image portion for a second time. Next, the process 26 may cache the output of the feature detection for the third image portion (Step 440) in the hopes that the registration window will not have to slide for the registration of the fourth image portion, thus allowing the process to reuse the cached results for the third image portion. Finally, the process 26 may register the second and third image portions using the output from the feature detection and/or cross-correlation performed over the determined location of third registration window (Step 442).

Figure 4D:
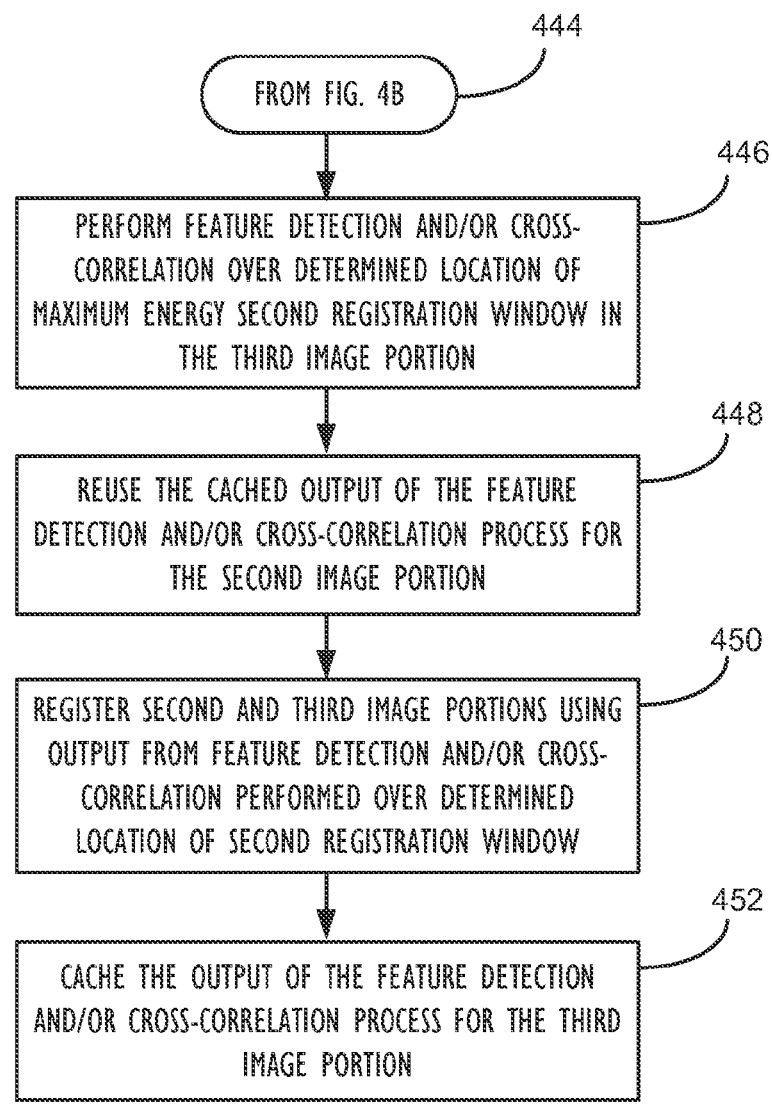

Turning now to FIG. 4D (Step 444), the process 26 may perform feature detection and/or cross-correlation over the determined location of the second registration window in second and third image portions (Step 446). In other words, if the flow of process 26 proceeds to FIG. 4D the "registration window inertia" has not been overcome, and the process 26 has determined that, in order to maintain real-time or near-real-time image registration, it cannot be justified from a processing standpoint to move the registration window and perform feature detection and/or cross-correlation on the second image portion for a second time. Instead, it has been determined that, though the image registration may not be at the location of maximum energy, it is currently located at a position of sufficient energy that the costs of re-running the feature detection and/or cross-correlation algorithm for a second time over the second image portion do not justify moving the image registration window. Next, the process 26 may reuse the cached output of the feature detection and/or cross-correlation process for the second image portion (Step 448) since the image registration window will not have moved since the previous registration calculation. Next, the process 26 may register the second and third image portions using the output from the feature detection and/or cross-correlation performed over the determined location of second registration window (Step 450). Finally, the process 26 may cache the output of the feature detection and/or cross-correlation process for the third image portion (Step 452) in the hopes that the registration window will again not have to slide for the registration of the fourth image portion.

It should be noted that, although FIGS. 4A-4D only contemplate the registration of up to three image portions, this is for illustrative purposes only. In actuality the image registration process 26 may run continuously on subsequently acquired image data until the user indicates a desire to cease the capture of the panoramic scene or the device runs out of free memory.

Turning now to FIG. 5, image registration techniques utilizing feature detection are illustrated at a high level, according to one embodiment. In FIG. 5, a first frame 500 is illustrated and labeled "FRAME 1" and a second frame 550 is illustrated and labeled "FRAME 2." FRAME 1 represents an image captured immediately before, or nearly immediately before FRAME 2 during a camera pan moving to the right. As such, the expected motion of stationary objects in the image will be to the left with respect to a viewer of the image. Thus, local subject motion opposite the direction of the camera's motion will be to the right (or even appear stationary if the object is moving at the same relative speed as the camera). Of course, local subject motion may be in any number of directions, at any speed, and located throughout the image.

The search vectors for five exemplary features located in FRAME 1 and FRAME 2 are now examined in greater detail (numbered 1-5). Features 1 and 2 correspond to the edges or corners of one of the buildings in the panoramic scene. As is shown in FRAME 2, these two features have moved in a leftward direction between the frames. This is expected movement, given the motion of the camera direction to the right. Feature 3 likewise represents a stationary feature, e.g., a tree, that has moved in the expected direction between frames, given the direction of the camera's motion. Features 4 and 5 correspond the edges near the wingtips of a bird. As the panoramic scene was being captured, the bird may have been flying in the direction of the camera's motion, thus, the search vectors calculated for Features 4 and 5 are directed to the right, and opposed to the direction of Features 1, 2, and 3. This type of local subject motion may actually worsen the image registration determination since it does not actually evidence the overall translation vector from FRAME 1 to FRAME 2.

Referring now to FIG. 6A, exemplary features 600 located in a sequence of image portions $354_{20}$-$354_{27}$ are shown, according to one embodiment. As shown, a group of features 600 are each represented as small black squares in the image. Exemplary features 600 may, for example, represent particular features output by a KLT or other feature detection algorithm. Prominent features may often occur near the edges or corner of objects, or other regions where there is a large change in contrast over a relatively small distance.

Figure 6B:
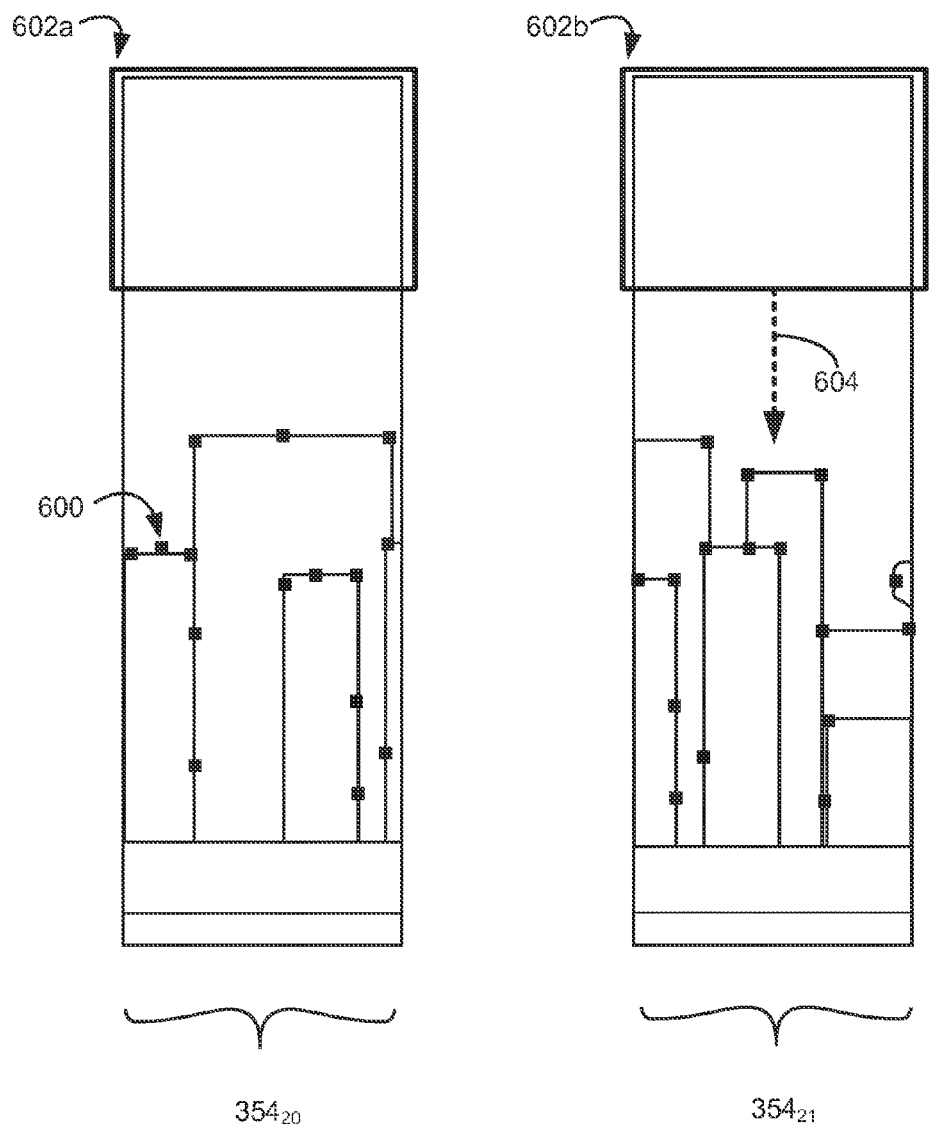
FIG. 6B illustrates exemplary sliding image registration windows, according to one embodiment.

Referring now to FIG. 6B, exemplary sliding image registration windows 602a and 602b are shown, according to one embodiment. As mentioned above, in one preferred embodiment, image registration windows have the same width as the image slices 354, but are one-fourth the height of the image slices 354. As described above in reference to FIG. 4A, and particularly in reference to Steps 402-410, the image registration window 602b may slide down the image slice $354_{21}$ in the direction of arrow 604 one row at a time, evaluating an overall energy score for each position of the image registration window 602b. Upon reaching the bottom of the image slice, the image registration process 26 may determine where the location of maximum energy is for the given image slice.

Figure 6C:
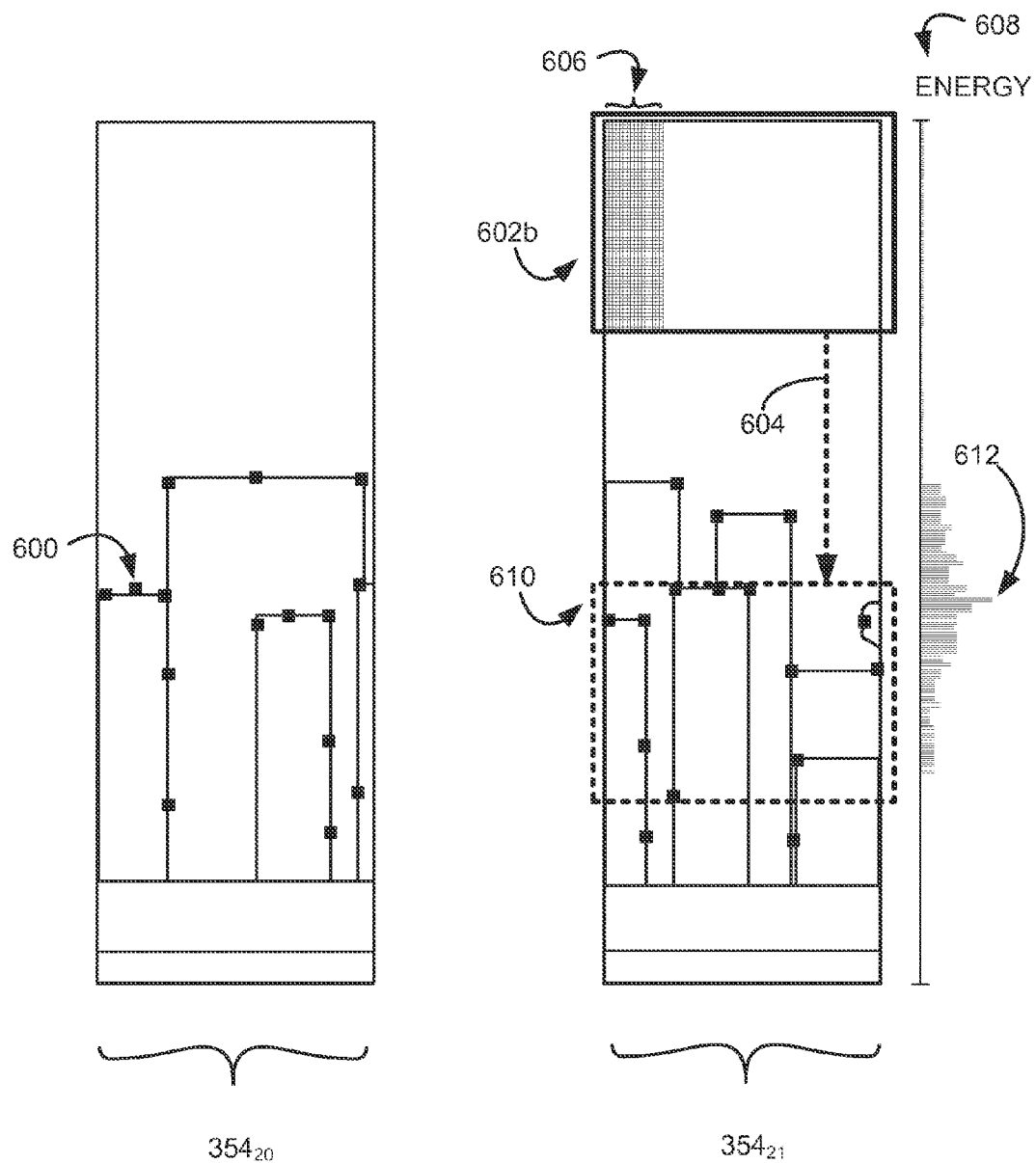
FIG. 6C illustrates an exemplary energy function evaluated in conjunction with a sliding registration window, according to one embodiment.

Referring now to FIG. 6C, an exemplary energy function 608 evaluated in conjunction with a sliding registration window 602b is shown, according to one embodiment. As described above in reference to FIG. 4A, and particularly in reference to Step 404, the energy function may evaluate the contrast (i.e., the maximum difference) over a predetermined number of pixels, e.g., 16 pixels, as shown by curly brace 606 in FIG. 6C, along the edge of image slice $354_{21}$ for each row over the height of the image registration window 602b and then sum the contrasts for each row in the image registration window 602b. The result of the summed energy values for a given location of an image registration window is represented by the energy function bar graph 608 along the right hand side of image slice $354_{21}$. As shown in FIG. 6C, there is one bar on graph 608 corresponding to the top of each possible image registration window location. Peak 612 along the graph for energy function 608 represents the location of the top of the image registration window having maximum energy 610 for image slice $354_{21}$. The location of peak 612 should not be surprising given the relatively large number of features 600 and edges located in the image registration window 610. Notice that near the top of image slice $354_{21}$, the energy function 608 has very low values due to the fact that it comprises a portion of the image consisting only of clear sky. If image registration were performed over only the top portion of the image slice, it is unlikely that enough features or correlated pixels could be located for a successful image registration.

Figure 6D:
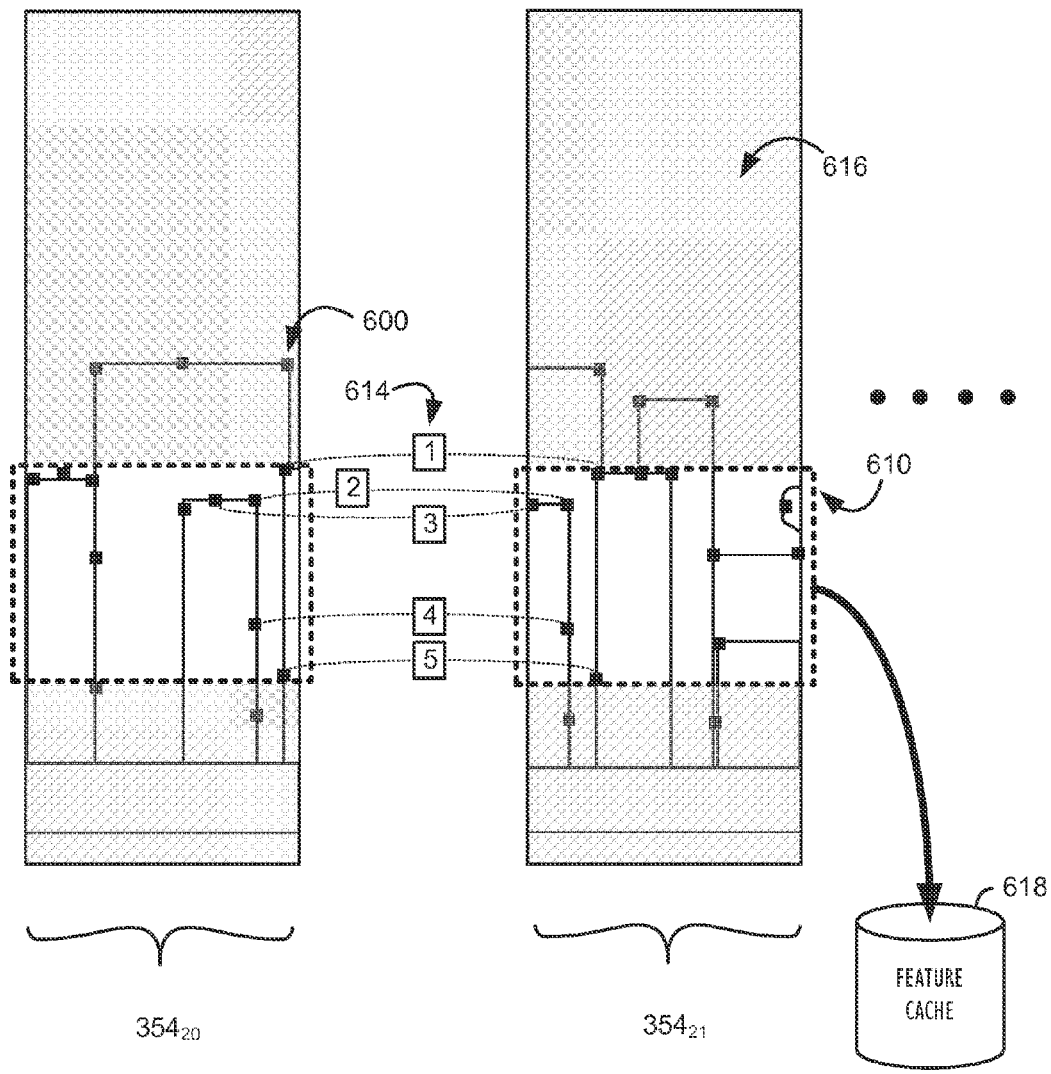
FIG. 6D illustrates feature detection applied within a sliding registration window and feature caching, according to one embodiment.

Referring now to FIG. 6D, feature detection applied within a sliding registration window 610 and feature caching 618 is shown, according to one embodiment. As determined in FIG. 6C, the image registration window 610 represents the location of maximum energy in image slice $354_{21}$. Thus, according to one embodiment disclosed herein, the rest of the image slice, represented by diagonally shaded portion 616, as well as the corresponding portion of image slice $354_{20}$ may be ignored in the image registration calculation. In other words, the candidate pixels from image slice $354_{21}$ comprise pixels from each of a subset of the rows (i.e., those rows in image registration window 610) in image slice $354_{21}$. Disregarding large portions of the image data can result in large performance improvements, and, with the intelligently chosen registration window location, the image slices may still be aligned satisfactorily. Also shown within registration window 610 are five matching features 614 between image slice $354_{20}$ and image slice $354_{21}$. Due to the relatively large number of matching features within the corresponding locations of the image registration windows 610, it is likely that a satisfactory alignment may be determined utilizing only the limited number of pixels within the image registration windows. As described above in reference to FIG. 4B, and particularly in reference to Step 420, the process 26 may store the output of the feature detection process for the second image portion in cache 618 with the hopes that it may be reused during the alignment of image slice $354_{21}$ and image slice $354_{22}$ (i.e., presuming that conditions (A) and (B) are not met for image slice $354_{23}$ and thus, that the sliding image registration window can remain at the location of image registration window 610 for the registration of image slice $354_{23}$).

Referring now to FIG. 7, the movement of a sliding image registration window 610 during the capture of an exemplary panoramic scene 28 assembled from image portions 354 is shown, in accordance with one embodiment. The location of the sliding image registration window 610 is represented in FIG. 7 as a rectangle having a thick black outline. As shown in FIG. 7, the sliding image registration window 610 starts out over image slices $354_1$ and $354_2$ at a first location, but then transitions at point 12 to a second location for the capture of image slice $354_3$. This must indicate that, between image slice $354_2$ and image slice $354_3$, the location of maximum energy changed by at least a first threshold distance (it appears to have moved downward by several hundred pixels) and the energy in image slice $354_3$ at the previous location of the sliding image registration window 610 was below a second threshold value (there appears to be predominantly plain sky in image slice $354_3$ at the previous height of the sliding image registration window 610). During the capture of the remainder of panoramic scene 28, there are several more image registration window jumps illustrated in FIG. 7. Recall that image registration window jumps are preferably few and far between during panoramic image capture so that the benefits of feature caching may be fully exploited, and thus threshold metric values may be determined empirically accordingly.

Empirical results have demonstrated that, performing image registration between two slices using a one-quarter image slice height image registration window on a particular device takes around 70 ms. Image registration using the full image slices on the same device takes more than 280 ms. When cached features can be used from the first slice, the registration using a one-quarter image slice height image registration window on the same device drops to about 45 ms. The cost to calculate the energy and position of the sliding image registration window on the device referenced above is only about 4 ms.

Figure 8:
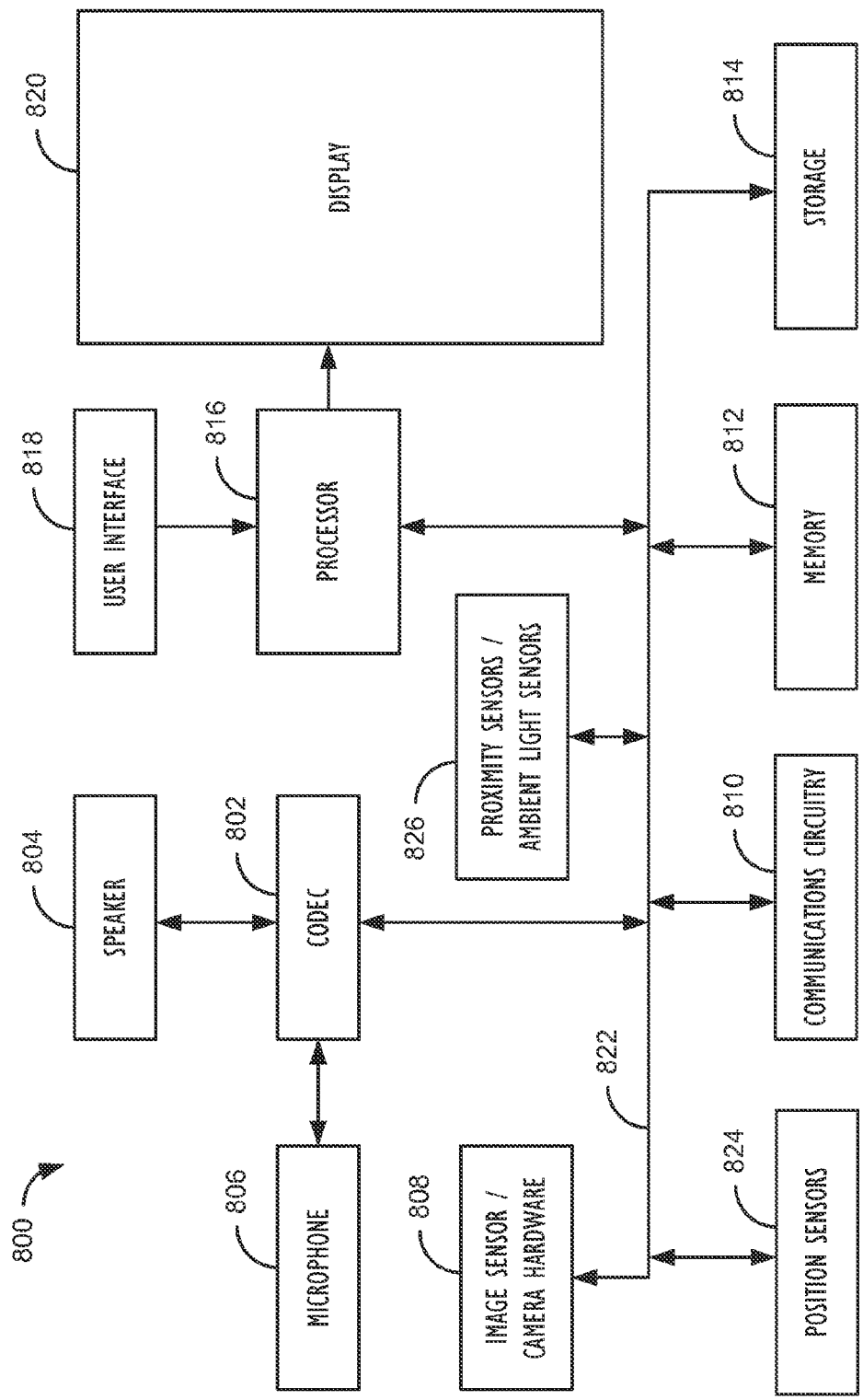
FIG. 8 illustrates a simplified functional block diagram of a representative electronic device possessing an image sensor and a display.

Referring now to FIG. 8, a simplified functional block diagram of a representative electronic device possessing a display 9 according to an illustrative embodiment, e.g., camera device 308, is shown. The electronic device 9 may include a processor 816, display 820, proximity sensor/ambient light sensor 826, microphone 806, audio/video codecs 10, speaker 11, communications circuitry 810, position sensors 824, image sensor with associated camera hardware 808, user interface 818, memory 812, storage device 814, and communications bus 822. Processor 816 may be any suitable programmable control device and may control the operation of many functions, such as the generation and/or processing of image metadata, as well as other functions performed by electronic device 9. Processor 816 may drive display 820 and may receive user inputs from the user interface 818. An embedded processor, such a Cortex® A8 with the ARM® v7-A architecture, provides a versatile and robust programmable control device that may be utilized for carrying out the disclosed techniques. (CORTEX® and ARM® are registered trademarks of the ARM Limited Company of the United Kingdom.)

Non-transitory storage device 814 may store media (e.g., image and video files), software or program code (e.g., for implementing various functions on device 9), preference information, device profile information, and any other suitable data. Storage device 814 may include one more storage mediums for tangibly recording image data and program instructions, including for example, a hard-drive, permanent memory such as ROM, semi-permanent memory such as RAM, or cache. Program instructions may comprise a software implementation encoded in any desired language (e.g., C or C++).

Memory 812 may include one or more different types of memory which may be used for performing device functions. For example, memory 812 may include cache, ROM, and/or RAM. Communications bus 822 may provide a data transfer path for transferring data to, from, or between at least storage device 814, memory 812, and processor 816. User interface 818 may allow a user to interact with the electronic device 9. For example, the user input device 818 can take a variety of forms, such as a button, keypad, dial, a click wheel, or a touch screen.

In one embodiment, the personal electronic device 9 may be an electronic device capable of processing and displaying media such as image and video files. For example, the personal electronic device 9 may be a device such as such a mobile phone, personal data assistant (PDA), portable music player, monitor, television, laptop, desktop, and tablet computer, or other suitable personal device.

Various changes in the materials, components, circuit elements, as well as in the details of the illustrated operational methods are possible without departing from the scope of the following claims. For example, the above description focuses on an application for assisting registration operations during panoramic image generation. The disclosed techniques are not so limited. The registration methodologies described herein may be used in any context in which a mosaic is to be generated. That is, where two or more images are to be "stitched" together to generate a new image. It is further noted that methodologies in accordance with this disclosure are not limited to the use of a single sliding registration window. Other embodiments may, for example, employ three (3) regions (a top, a middle and a bottom region). The use of multiple registration windows may be particularly useful when performing perspective corrections, especially when parallax problems are limited to one of the regions.

The foregoing description of preferred and other embodiments is not intended to limit or restrict the scope or applicability of the inventive concepts conceived of by the Applicants. As one example, although the present disclosure focused on handheld personal electronic devices, it will be appreciated that the teachings of the present disclosure can be applied to other implementations, such as traditional digital cameras. In exchange for disclosing the inventive concepts contained herein, the Applicants desire all patent rights afforded by the appended claims. Therefore, it is intended that the appended claims include all modifications and alterations to the full extent that they come within the scope of the following claims or the equivalents thereof.

What is claimed is:

1. An image registration method, comprising:
   receiving a first image from an image sensor, the first image having a first number of rows, each row having a second number of pixels;
   receiving a second image from the image sensor, the second image having the first number of rows, each row having the second number of pixels, wherein each row in the second image has a corresponding row in the first image and each pixel in the second image has a corresponding pixel in the first image;
   identifying a subset of rows in the second image, wherein identifying a subset of rows in the second image comprises identifying a subset of contiguous rows, from among a plurality of subsets of contiguous rows in the second image, having a highest score, wherein each of the plurality of subsets of contiguous rows is determined by a location of an image registration window, wherein the image registration window slides one row at a time down a length of the second image, and wherein a score for each of the plurality of subsets of contiguous rows is based on a first number of pixel values in each row of the subset of contiguous rows; and
   registering the first image and the second image using only a subset of pixels in each of the identified subset of rows in the second image and the corresponding subset of pixels in a corresponding subset of rows in the first image.

2. The method of claim 1, wherein the first number of pixel values in each row of the subset of contiguous rows comprise less than all of the pixel values in the row.

3. The method of claim 1, wherein identifying a subset of rows in the second image comprises:
   determining a plurality of scores for the second image, wherein each score corresponds to a different subset of rows in the second image; and
   identifying a subset of rows corresponding to a highest score.

4. The method of claim 3, wherein determining a plurality of scores for the second image, wherein each score corresponds to a different subset of rows in the second image comprises, for each subset of rows:
   determining a first value for each row in the subset of rows, wherein the first value is based on values of pixels in the row; and
   combining the first value for each row in the subset of rows to generate a score for the subset of rows.

5. The method of claim 4, wherein determining a first value for each row in the subset of rows comprises using values of pixels from less than all of the pixels in the row.

6. The method of claim 1, wherein registering the first image and the second image comprises:
   detecting first features in the subset of rows in the second image;
   detecting second features in the corresponding subset of rows in the first image; and
   registering the second image to the first image based on the first detected features and the second detected features.

7. The method of claim 1, wherein registering the first image and the second image comprises:
   cross-correlating the subset of pixels in the subset of rows in the second image with the corresponding subset of pixels in the corresponding subset of rows in the first image; and
   registering the second image to the first image based on the cross-correlation.

8. A non-transitory program storage device having computer code stored thereon for causing a programmable control device to perform the method of claim 1.

9. The non-transitory program storage device of claim 8, wherein the computer program code further causes the programmable control device to perform the method of claim 2.

10. A digital image capture device, comprising:
    an image sensor;
    a memory coupled to the image sensor; and
    a program control device coupled to the memory, the program control device adapted to execute computer program instructions stored in the memory to perform the method of claim 1.

11. The digital image capture device of claim 10, wherein the computer program instructions further cause the program control device to perform the method of claim 2.

12. An image registration method, comprising:
    storing a first image in a first memory, the first image having a first number of rows of pixels, each row of pixels having a second number of pixels;
    storing a second image in a second memory, the second image having the first number of rows of pixels, wherein each row of pixels in the second image has the second number of pixels, and wherein each pixel in the second image has a corresponding pixel in the first image;
    identifying a first candidate portion of pixels in the second image from among a plurality of candidate portions in the second image, wherein each candidate portion comprises a subset of pixels from each of a contiguous subset of rows in the second image, wherein each of the plurality of subsets of contiguous rows is determined by a location of an image registration window, wherein the image registration window slides one row at a time down a length of the second image, wherein the first candidate portion of pixels is indicative of one or more features in the second image, and wherein the first candidate portion of pixels comprises a portion of pixels having a highest score from among the plurality of candidate portions in the second image;
    identifying a first portion of pixels in the first image based on the first candidate portion of the second image, each pixel in the first portion of pixels in the first image having a corresponding pixel in the first candidate portion of pixels in the second image; and
    registering the first image and the second image using only the first candidate portion of pixels in the second image and the corresponding pixels in the first portion of pixels in the first image.

13. The method of claim 12, wherein identifying a first candidate portion of pixels in the second image further comprises:
    (a) creating a first image registration window over the second image at a first location, the first image registration window comprising a predetermined number of rows of pixels in the second image, wherein the predetermined number of rows is less than the total number of rows in the second image;
    (b) determining a value for each row of pixels in the first image registration window at the first location;
    (c) determining a first score for the first image registration window at the first location based on the determined values for each of the rows of pixels in the first image registration window;
    repeating steps (a)-(c) for each possible first location of the first image registration window over the second image;
    identifying the first location of the first image registration window over the second image having the highest first score as the first maximum location; and
    identifying the pixels falling within the identified first maximum location as the first candidate portion of pixels in the second image.

14. The method of claim 13, wherein determining a value for each row of pixels comprises determining a contrast value.

15. The method of claim 14, wherein determining the contrast value comprises determining the difference in luminance between the brightest pixel in the row of pixels and the darkest pixel in the row of pixels.

16. The method of claim 13, wherein determining a value for each row of pixels comprises examining a subset of the total number of pixels in each row.

17. The method of claim 13, further comprising:
    storing a third image in a third memory, the third image having the first number of rows of pixels, wherein each row of pixels in the third image has the second number of pixels, and wherein each pixel in the third image has a corresponding pixel in the second image;
    identifying a second candidate portion of pixels in the third image, the second candidate portion of pixels indicative of one or more features in the third image, the second candidate portion of pixels being less than the entire third image;
    identifying a second portion of pixels in the second image based on the second candidate portion of pixels in the third image, each pixel in the second portion of pixels in the second image having a corresponding pixel in the second candidate portion of pixels in the third image; and registering the second image and the third image using only the second candidate portion of pixels in the third image and the corresponding pixels in the second portion of pixels in the second image.

18. The method of claim 17, wherein identifying a second candidate portion of pixels in the third image comprises:
   (d) creating a second image registration window over the third image at a second location, the second image registration window comprising a predetermined number of rows of pixels in the third image, wherein the predetermined number of rows is less than the total number of rows in the third image;
   (e) determining a value for each row of pixels in the second image registration window at the second location;
   (f) determining a second score for the second image registration window at the second location based on the determined values for each of the rows of pixels in the second image registration window;
   repeating steps (d)-(f) for each possible second location of the second image registration window over the third image;
   identifying the second location of the second image registration window over the third image having the highest second score as the second maximum location;
   evaluating one or more threshold metrics related to the identified second maximum location; and
   identifying the pixels falling within the identified second maximum location as the second candidate portion pixels if the one or more evaluated threshold metrics are met or exceeded; and otherwise
   identifying the pixels falling within the region of the third image corresponding to the identified first maximum location in the second image as the second candidate portion pixels.

19. The method of claim 18, wherein one of the one or more threshold metrics comprises a distance metric, and wherein one of the one or more threshold metrics comprises a score metric.

20. The method of claim 17, wherein the act of identifying a second candidate portion of pixels in the third image comprises:
   (d) creating a second image registration window over the third image at a second location, the second image registration window comprising a predetermined number of rows of pixels in the third image, wherein the predetermined number of rows is less than the total number of rows in the third image;
   (e) determining a value for each row of pixels in the second image registration window at the second location;
   (f) determining a second score for the second image registration window at the second location based on the determined values for each of the rows of pixels in the second image registration window;
   repeating steps (d)-(f) for each possible second location of the second image registration window over the third image;
   identifying the second location of the second image registration window over the third image having the highest second score as the second maximum location; and
   identifying the pixels falling within the identified second maximum location as the second candidate portion of pixels in the third image.

21. A non-transitory program storage device that tangibly embodies computer program code for causing a program control device to perform the method of claim 12.

22. The non-transitory program storage device of claim 21, wherein the computer program code further causes the program control device to perform the method of claim 13.

23. The non-transitory program storage device of claim 21, wherein the computer program code further causes the program control device to perform the method of claim 17.

24. The non-transitory program storage device of claim 21, wherein the computer program code further causes the program control device to perform the method of claim 18.

25. A digital image capture device, comprising:
   an image sensor;
   a first memory coupled to the image sensor;
   a second memory; and
   a program control device coupled to the first memory and the second memory, the program control device adapted to execute computer program instructions stored in the second memory to:
      store an image from the image capture sensor in the first memory;
      store a portion of the image in the first memory in the second memory to provide a first image;
      store another image from the image capture sensor in the first memory;
      store a portion of the another image in the first memory in the second memory to provide a second image, wherein each of the first image and the second image have a number of rows of pixels with each row of pixels having the same number of pixels;
      identify a candidate portion of pixels in the second image from among a plurality of candidate portions in the second image, wherein each candidate portion comprises a subset of pixels from each of a contiguous subset of rows in the second image, wherein each of the plurality of subsets of contiguous rows is determined by a location of an image registration window, wherein the image registration window slides one row at a time down a length of the second image, wherein the candidate portion of pixels is indicative of one or more features in the second image, and wherein the candidate portion of pixels comprises a portion of pixels having a highest score from among the plurality of candidate portions in the second image;
      identify a first portion of pixels in the first image based on the candidate portion, each pixel in the first portion having a corresponding pixel in the candidate portion; and
      registering the first image and the second image using only the candidate portion of pixels in the second image and the corresponding pixels in the first portion of pixels in the first image.

26. The device of claim 25, wherein the program instructions to identify a candidate portion of pixels in the second image, further comprise program instructions to:
   (a) create a first image registration window over the second image at a first location, the first image registration window comprising a predetermined number of rows of pixels in the second image, wherein the predetermined number of rows is less than the total number of rows in the second image;
   (b) determine a value for each row of pixels in the first image registration window at the first location;

(c) determine a first score for the first image registration window at the first location based on the determined values for each of the rows of pixels in the first image registration window;

repeat steps (a)-(c) for each possible first location of the first image registration window over the second image;

identify the first location of the first image registration window over the second image having the highest first score as the first maximum location; and identify the pixels falling within the identified first maximum location as the candidate portion of pixels in the second image.

\* \* \* \* \*